(12) United States Patent
Jiang et al.

(10) Patent No.: US 10,628,705 B2
(45) Date of Patent: Apr. 21, 2020

(54) COMBINING CONVOLUTION AND DECONVOLUTION FOR OBJECT DETECTION

(71) Applicant: QUALCOMM Incorporated, San Diego, CA (US)

(72) Inventors: Bolan Jiang, San Diego, CA (US); Xin Li, Bethlehem, PA (US); Shuxue Quan, San Diego, CA (US); Yunke Pan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 15/940,907

(22) Filed: Mar. 29, 2018

(65) Prior Publication Data

US 2019/0303715 A1 Oct. 3, 2019

(51) Int. Cl.

| G06K 9/66 | (2006.01) |
|---|---|
| G06K 9/62 | (2006.01) |
| G06K 9/32 | (2006.01) |
| G06N 3/04 | (2006.01) |
| G06N 3/08 | (2006.01) |

(52) U.S. Cl.
CPC ......... *G06K 9/6232* (2013.01); *G06K 9/3241* (2013.01); *G06K 9/6272* (2013.01); *G06K 9/66* (2013.01); *G06N 3/0454* (2013.01); *G06N 3/084* (2013.01)

(58) Field of Classification Search
CPC ...... G06K 9/6232; G06K 9/3241; G06K 9/66; G06K 9/6272; G06N 3/084; G06N 3/0454

USPC ....... 382/157, 155, 156, 159, 181, 190, 195, 382/203, 276, 282, 224, 192, 194, 209, 382/217, 218; 706/15, 16, 18, 20, 21, 22, 706/26, 38, 27, 31, 45, 46, 50, 24, 14, 12
See application file for complete search history.

(56) References Cited

U.S. PATENT DOCUMENTS

| 10,083,378 | B2 * | 9/2018 | Chakraborty | ............ G06K 9/66 |
|---|---|---|---|---|
| 10,373,052 | B2 * | 8/2019 | Dinu | ...................... G06K 9/627 |
| 10,460,175 | B1 * | 10/2019 | Gould | .................. G06K 9/6273 |
| 2016/0328630 | A1 | 11/2016 | Han et al. | |
| 2017/0169313 | A1 | 6/2017 | Choi et al. | |
| 2017/0356976 | A1 * | 12/2017 | Shapiro | ................ G06K 9/6273 |
| 2018/0150715 | A1 * | 5/2018 | Chang | .................. G06K 9/4609 |

(Continued)

FOREIGN PATENT DOCUMENTS

| CN | 106981067 A | 7/2017 |
|---|---|---|
| WO | 2017106998 A1 | 6/2017 |
| WO | 2017139927 A1 | 8/2017 |

*Primary Examiner* — Sheela C Chawan

(74) *Attorney, Agent, or Firm* — Polsinelli LLP

(57) ABSTRACT

Provided are systems, methods, and computer-readable medium for operating a neural network. In various implementations, the neural network can receive an input image that includes an object to be identified. The neural network can generate a plurality of initial feature maps using a convolution layers, wherein a first initial feature maps is generated using the input image. The neural network can generate an up-sampled feature map using a de-convolution layer that takes an initial feature map as input, where the up-sampled feature map has a same resolution as the previous initial feature map. The neural network can combine the up-sampled feature map and the previous initial feature map, and use the combined feature map to more accurate identify the object.

30 Claims, 18 Drawing Sheets

(56) References Cited

U.S. PATENT DOCUMENTS

2019/0005375 A1\* 1/2019 Mody .................... G06N 3/04
2019/0258306 A1\* 8/2019 Croxford ................ G06F 7/57

\* cited by examiner

420

| 1 | 0 | 1 |
|---|---|---|
| 0 | 1 | 0 |
| 1 | 0 | 1 |

| 0 | 0 | 1 | 0 | 0 |
|---|---|---|---|---|
| 0 | 1 | 1 | 1 | 0 |
| 1 | 1 | 1 | 1 | 1 |
| 1 | 1 | 0 | 0 | 1 |
| 1 | 0 | 0 | 0 | 0 |

FIG. 4A

COMBINING CONVOLUTION AND DECONVOLUTION FOR OBJECT DETECTION

BACKGROUND

Deep neural networks, particularly convolutional neural networks, are widely used for object detection. Convolutional neural networks are able to extract high-level features, such as facial shapes, from an input image, and use these high-level features to output a probability that, for example, an input image includes a dog, a cat, a boat, or a bird. An artificial neural network attempts to replicate, using computer technology, logical reasoning performed by the biological neural networks that constitute animal brains.

BRIEF SUMMARY

In various implementations, techniques and systems are described for improving the accuracy of a convolutional neural network using one or more de-convolution layers. De-convoluting a feature map output from a convolution layer can preserve the semantic information of the feature map while up-sampling the feature map to a larger resolution. Combining the up-sampled feature map with a feature map output by a convolution layer can produce a combined feature map that has both good semantic information and good spatial information. The combined feature map may thus enable a neural network to produce more accurate predictions.

According to at least one example, a method for object identification is provided that includes receiving an input image including a representation of an object to be identified. The method further includes generating a plurality of initial feature maps using a plurality of convolution layers of a neural network, wherein a first initial feature map of the plurality of initial feature maps is generated from the input image, and wherein one or more initial feature maps of the plurality of initial feature maps are generated from one or more previous initial feature maps of the plurality of initial feature maps. The method further includes generating, using a de-convolution layer of the neural network, an up-sampled feature map from an initial feature map of the plurality initial feature maps, wherein the up-sampled feature map has a same resolution as a previous initial feature map of the plurality of initial feature maps. The method further includes combining the previous initial feature map and the up-sampled feature map to produce a combined feature map. The method further includes identifying the object represented in the input image using the combined feature map.

In another example, an apparatus is provided that includes a memory configured to store an input image including a representation of an object to be identified and a processor. The processor is configured to and can generate a plurality of initial feature maps using a plurality of convolution layers of a neural network, wherein a first initial feature map of the plurality of initial feature maps is generated from the input image, and wherein one or more initial feature maps of the plurality of initial feature maps are generated from one or more previous initial feature maps of the plurality of initial feature maps. The processor is configured to and can generate, using a de-convolution layer of the neural network, an up-sampled feature map from an initial feature map of the plurality initial feature maps, wherein the up-sampled feature map has a same resolution as a previous initial feature map of the plurality of initial feature maps. The processor is configured to and can combine the previous initial feature map and the up-sampled feature map to produce a combined feature map. The processor is configured to and can identify the object represented in the input image using the combined feature map.

In another example, a non-transitory computer readable medium is provided having stored thereon instructions that when executed by a processor to perform operations including: receiving an input image including a representation of an object to be identified. The instructions further cause the processor to perform operations including generating a plurality of initial feature maps using a plurality of convolution layers of a neural network, wherein a first initial feature map of the plurality of initial feature maps is generated from the input image, and wherein one or more initial feature maps of the plurality of initial feature maps are generated from one or more previous initial feature maps of the plurality of initial feature maps. The instructions further cause the processor to perform operations including generating, using a de-convolution layer of the neural network, an up-sampled feature map from an initial feature map of the plurality initial feature maps, wherein the up-sampled feature map has a same resolution as a previous initial feature map of the plurality of initial feature maps. The instructions further cause the processor to perform operations including combining the previous initial feature map and the up-sampled feature map to produce a combined feature map. The instructions further cause the processor to perform operations including identifying the object represented in the input image using the combined feature map.

In another example, an apparatus is provided that includes means for receiving an input image including a representation of an object to be identified. The apparatus further comprises means for generating a plurality of initial feature maps using a plurality of convolution layers of a neural network, wherein a first initial feature map of the plurality of initial feature maps is generated from the input image, and wherein one or more initial feature maps of the plurality of initial feature maps are generated from one or more previous initial feature maps of the plurality of initial feature maps. The apparatus further comprises means for generating, using a de-convolution layer of the neural network, an up-sampled feature map from an initial feature map of the plurality initial feature maps, wherein the up-sampled feature map has a same resolution as a previous initial feature map of the plurality of initial feature maps. The apparatus further comprises means for combining the previous initial feature map and the up-sampled feature map to produce a combined feature map. The apparatus further comprises means for identifying the object represented in the input image using the combined feature map.

In some aspects, the previous initial feature map and the up-sampled feature map are combined using a concatenation operation. In some aspects, the previous initial feature map and the up-sampled feature map are combined using a maximum value operation.

In some aspects, the combined feature map has a greater depth than the previous initial feature map. In some aspects, the combined feature map has a same depth as the previous initial feature map.

In some aspects, the up-sampled feature map is generated without using a rectified linear unit operation.

In some aspects, the plurality of convolution layers perform a convolution to produce the plurality of initial feature maps. In some aspects, the de-convolution layer performs a deconvolution on the initial feature map to produce the up-sampled feature map.

In some aspects, identifying the object further includes using a highest level feature map generated by the neural network.

In some aspects, identifying the object further includes categorizing the combined feature map using at least one fully-connected layer, wherein each node in the at least one fully-connected layer outputs a weighted sum that indicates a probable category.

In some aspects, the methods, apparatuses, and computer readable medium described above further comprise generating, using a second de-convolution layer of the neural network, a second up-sampled feature map from the combined feature map, wherein the second up-sampled feature map has a same resolution as a second previous initial feature map from the plurality of initial feature maps. These aspects further comprise combining the second previous initial feature map with the second up-sampled feature map to produce a second combined feature map, wherein identifying the object is further based on the second combined feature map.

In some aspects, the previous initial feature map is generated using a convolution layer from the plurality of convolution layers that precedes a convolution layer from the plurality of convolution layers used to generate the initial feature map.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

FIG. 4A, FIG. 4B, and FIG. 4C are diagrams illustrating a simple example of a convolution.

DETAILED DESCRIPTION

Figure 1:
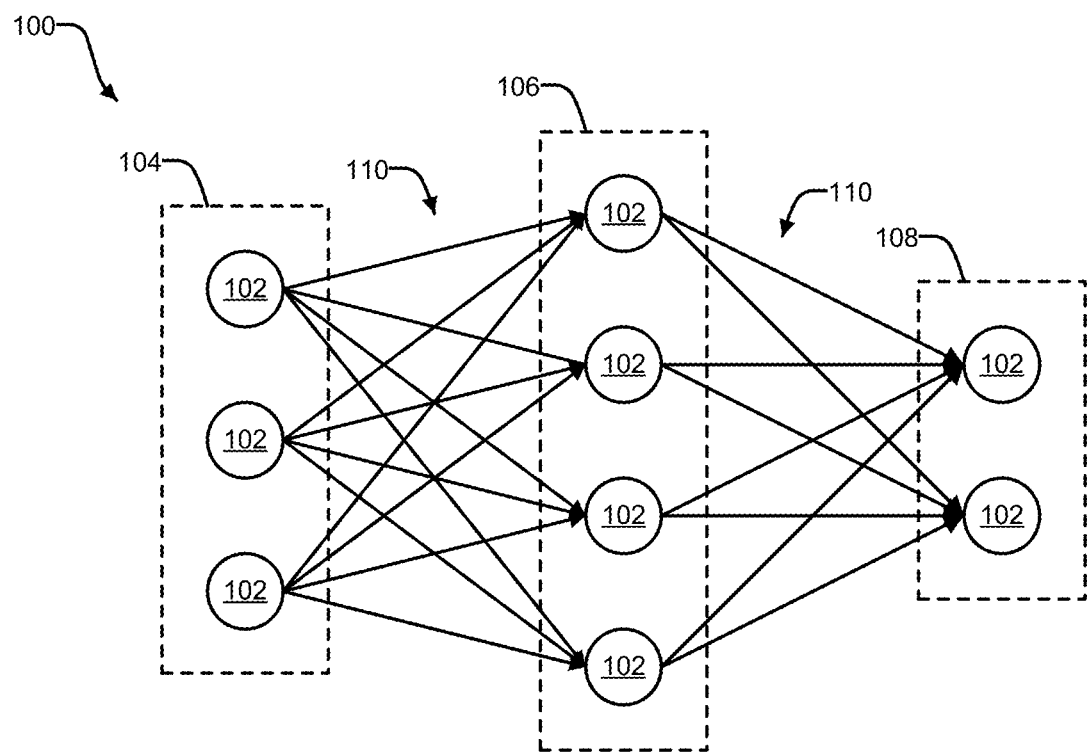
FIG. 1 is a diagram illustrating an example of a visual model for a neural network.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Deep neural networks, particularly convolutional neural networks, are widely used for object detection. Convolutional neural networks are able to extract high-level features, such as facial shapes, from an input image, and use these high-level features to output a probability that, for example, an input image includes a dog, a cat, a boat, or a bird.

It has been found that deeper neural networks are able to produce more accurate outputs. Greater depth is achieved by adding more layers to the neural network. Increasing the depth, however, can increase the number of computations that need to be performed for a given input, as well as the amount of storage space needed for storing intermediate results.

Additionally, while higher layers in a neural network better capture abstract features, higher layers can reduce the input image into successively lower resolution representations. The lower resolution representations can refine the information extracted from the input image, but can lose spatial information. Thus, for example, the performance of a deep neural network, in terms of accuracy of prediction, may suffer when an object to be identified in an image is small with respect to the size of the image.

In various implementations, provided are systems, methods, and computer-readable mediums for a neural network architecture that uses deconvolution to preserve spatial information. In various implementations, the neural network architecture includes one or more deconvolution operations, performed in deconvolution layers. Higher-level feature maps, which can have a lower resolution than lower-level feature maps, can be up-sampled or up-scaled using a deconvolution operation implemented in a deconvolution layer. The higher-resolution feature maps produced by a de-convolutional layer can then be combined with feature maps produced by the convolution layers. The combined feature maps can then be used to determine an output prediction.

A convolutional neural network that uses deconvolution to preserve spatial information can have better performance than convolutional neural networks that do not include deconvolution. Better performance can be measured, for example, in terms of the network's accuracy in identifying the contents of image data. For example, a convolutional neural network with deconvolution may have better accuracy when the object to be identified is small in comparison to the dimensions of the input image.

Adding deconvolution to particularly to small neural networks can improve the accuracy of these neural networks. Small neural networks have fewer layers and/or perform depth-wise convolution, and thus need to perform fewer computations. Deep neural networks can execute a very large number of computations, and can generate a large amount of intermediate data. Deep neural networks have thus been run using systems that have a large amount of processing capability and storage space. Mobile devices, such as smart phones, tablet computers, laptops, and other devices that are intended to be easy to transport, however, may have less powerful processors and may have less storage space due to factors such as the size of the device, available battery power, and need for the device to be lightweight. Thus smaller neural networks may be used in resource-limited applications. Smaller neural networks may be less accurate than deep neural networks, thus techniques such as those discussed herein can be applied to improve the prediction accuracy of small neural networks.

An artificial neural network attempts to replicate, using computer technology, logical reasoning performed by the biological neural networks that constitute animal brains. Neural networks fall within a sub-field of artificial intelligence called machine learning. Machine learning is a field of study that investigates giving computers the ability to learn without being explicitly programmed. A software program that is explicitly programmed must account for all possible inputs, scenarios, and outcomes. In contrast, a software program that uses machine learning algorithms learns by being given inputs and receiving feedback as to the correctness of the output the program produces. The feedback is incorporated into the program, so that the program can produce a better result for the same or similar input.

Neural networks take inspiration from the mechanics of the operation of the human brain, to the extent that these operations are understood. According to various models of the brain, the main computational element of the brain is the neuron. Neurons are connected together with a number of elements, with elements entering a neuron being referred to as dendrites and an element leaving a neuron being referred to as an axon. A neuron accepts signals via dendrites, performs a computation on the signals, and outputs a signal on an axon. The input and output signals are referred to as activations. The axon of one neuron can branch out and be connected to the dendrites of multiple neurons. The connection between a branch of an axon and a dendrite is called a synapse.

A synapse can scale the signal crossing the synapse. The scaling factor is referred to as a weight, and is thought of as the way a brain is able to learn: different weights result from different responses to input. Learning can change the weights, but the organization of the neurons and synapses need not change to obtain the learning. The static structure of the brain can thus be used as a model for a program, and the weights can reflect a task or tasks that the program has learned to perform.

Neural networks operate on the notion that a neuron's computation involves a weighted sum of input values. These weighted sums correspond to the value scaling performed by the synapses and the combining of those values in the neuron. A functional operation is performed in the neuron on the combined inputs. In the brain model, the operation appears to be a non-linear function that causes the neuron to generate an output only when the inputs cross some threshold. Thus, by analogy, a node of a neural network can apply a non-linear function to the weighted sum of the values input into the node.

FIG. 1 is a diagram illustrating an example of a visual model 100 for a neural network. In this example, the model 100 includes an input layer 104, a middle layer that is often referred to as a hidden layer 106, and an output layer 108. Each layer includes some number of nodes 102. In this example, the nodes 102 of the input layer 104 are connected to each node 102 of the hidden layer 106. The connections, which would be referred to as synapses in the brain model, are referred to as weights 110. Also in this example, each node 102 of the hidden layer 106 has a connection or weight 110 with each node 102 of the output layer. The input layer 104 can receive inputs and can propagate the inputs to the hidden layer 106. A neural network implementation can include multiple hidden layers. Weighted sums computed by the hidden layer 106 (or multiple hidden layers) are propagated to the output layer 108, which can present final outputs to a user. The outputs of the nodes 102 can be referred to as activations, in keeping with the brain model.

An example of a computation that can occur at each layer in the example model 100 is as follows:

$$y_j = f\left(\sum_{i=1}^{3} W_{ij} \times x_i + b\right)$$

In the above equation, $W_{ij}$ is a weight, $x_i$ is an input activation, $y_j$ is an output activation, $f(\ )$ is a non-linear function, and b is a bias term. Various non-linear functions can be used to achieve different purposes.

The model 100 can be referred to as a directed, weighted graph. In a directed graph, each connection to or from a node indicates a direction (e.g., into the node or away from the node). In a weighted graph, each connection can have a weight. Tools for developing neural networks can visualize the neural network as a directed, weighted graph, for ease of understanding and debuggability. In some cases, these tools can also be used to train the neural network and output trained weight values. Executing the neural network is then a matter of using the weights to conduct computations on input data.

A neural network that has more than three layers (e.g., more than one hidden layer) is sometimes referred to as a deep neural network. Deep neural networks can have, for example, five to more than a thousand layers.

Neural networks with many layers can be capable of learning high-level tasks that have more complexity and abstraction than shallower networks. As an example, a neural network can be taught to recognize images. In this example, pixels of an image can be fed into the input layer of the neural network, and the outputs of the first layer can indicate the presences of low-level features in the image, such as lines and edges. At subsequent layers, these features can be combined to measure the likely presence of higher level features: the lines can be combined into shapes, which can be further combined into sets of shapes. Given all this information, the neural network can output a probability that the high-level features represent a particular object or scene. For example, the neural network can output whether an image contains a cat or does not contain a cat.

The learning phase of a neural network is referred to as training the neural network. During training, the neural network is taught to perform a task. In learning the task, values for the weights (and possibly also the bias) are determined. The underlying program for the neural network (e.g., the organization of nodes into layers, the connections between the nodes of each layer, and the computation executed by each node), does not need to change during training. Once trained, the neural network can perform the task by computing a result using the weight values that were determined during training. For example, the neural network can output the probability that an image contains a particular object, the probability that an audio sequence contains a particular word, a bounding box in an image around an object, or a proposed action that should be taken. Running the program for the neural network is referred to as inference.

There are multiple ways in which weights can be trained. One method is called supervised learning. In supervised learning, all training samples are labeled, so that inputting each training sample into a neural network produces a known result. Another method is called unsupervised learning, where the training samples are not labeled and training aims to find a structure in the data or clusters in the data. Semi-supervised learning falls between supervised and unsupervised learning. In semi-supervised learning, a subset of training data is labeled. The unlabeled data can be used to define cluster boundaries and the labeled data can be used to label the clusters.

Figure 2A:
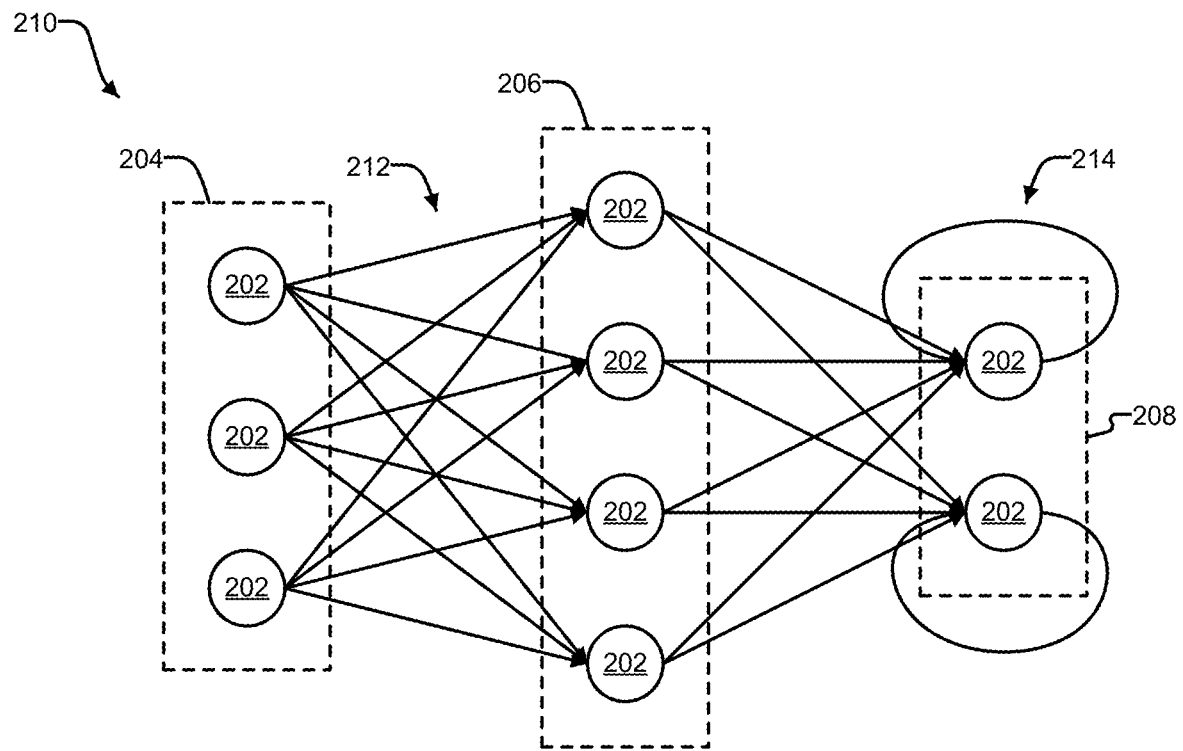
FIG. 2A is a diagram illustrating an example of a model for a neural network that includes feed-forward weights and recurrent weights.

Different varieties of neural networks have been developed. Various examples of neural networks can be divided into two forms: feed-forward and recurrent. FIG. 2A is a diagram illustrating an example of a model 210 for a neural network that includes feed-forward weights 212 between an input layer 204 and a hidden layer 206, and recurrent weights 214 at the output layer 208. In a feed-forward neural network, the computation is a sequence of operations on the outputs of a previous layer, with the final layer generating the outputs of the neural network. In the example illustrated in FIG. 2A, feed-forward is illustrated by the hidden layer 206, whose nodes 202 operate only the outputs of the nodes 202 in the input layer 204. A feed-forward neural network has no memory and the output for a given input can be always the same, irrespective of any previous inputs given to the neural network. The Multi-Layer Perceptron (MLP) is one type of neural network that has only feed-forward weights.

In contrast, recurrent neural networks have an internal memory that can allow dependencies to affect the output. In a recurrent neural network, some intermediate operations can generate values that are stored internally and can be used as inputs to other operations, in conjunction with the processing of later input. In the example of FIG. 2A, recurrence is illustrated by the output layer 208, where the outputs of the nodes 202 of the output layer 208 are connected back to the inputs of the nodes 202 of the output layer 208. These looped-back connections can be referred to as recurrent weights 214. Long Short-Term Memory (LSTM) is a frequently used recurrent neural network variant.

Figure 2B:
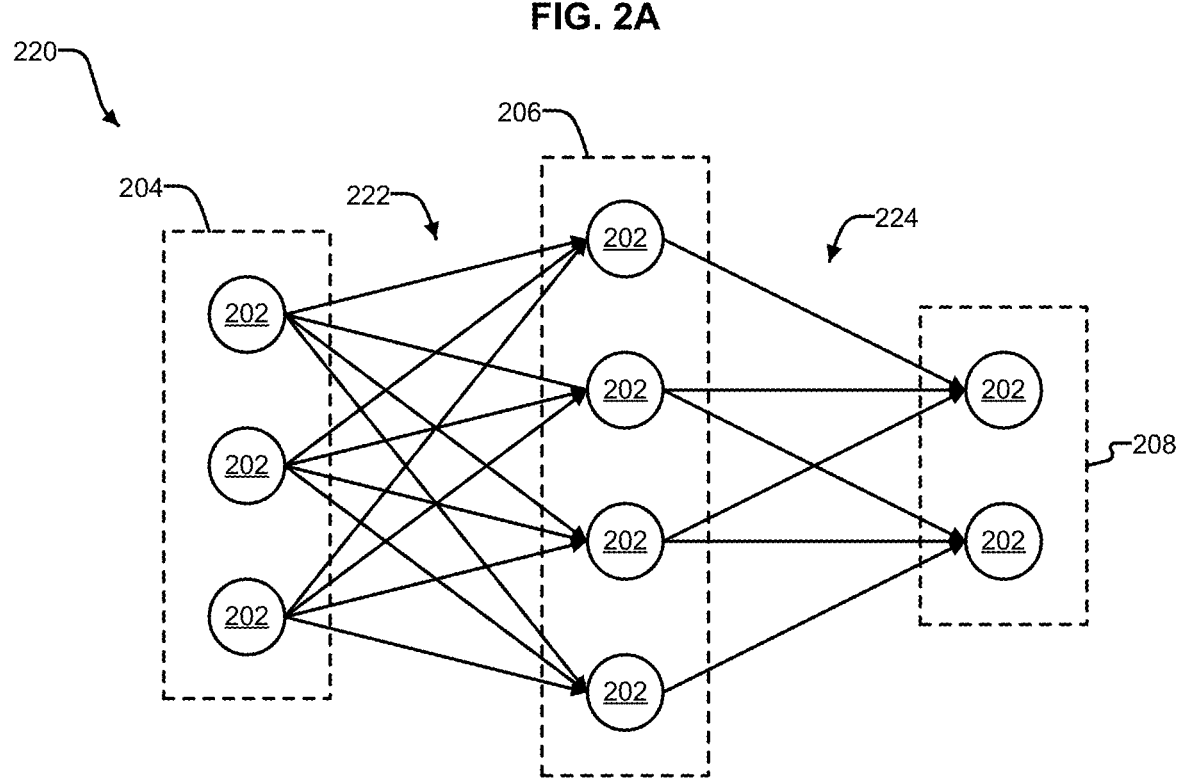
FIG. 2B is a diagram illustrates an example of a model for a neural network that includes different connection types.

FIG. 2B is a diagram illustrating an example of a model 220 for a neural network that includes different connection types. In this example model 220, the input layer 204 and the hidden layer 206 are fully connected 222 layers. In a fully connected layer, all output activations are composed of the weighted input activations (e.g., the outputs of all the nodes 202 in the input layer 204 are connected to all of the inputs of the hidden layer 206). Fully connected layers can require a significant amount of storage and computations. Multi-Layer Perceptron neural networks are one type of neural network that is fully connected.

In some applications, some connections between the activations can be removed, for example by setting the weights for these connections to zero, without affecting the accuracy of the output. The result is sparsely connected 224 layers, illustrated in FIG. 2B by the weights between the hidden layer 206 and the output layer 208. Pooling is another example of a method that can achieve sparsely connected 224 layers. In pooling, the outputs of a cluster of nodes can be combined, for example by finding a maximum value, minimum value, mean value, or median value.

A category of neural networks referred to as convolutional neural networks (CNNs) have been particularly effective for image recognition and classification. A convolutional neural network can learn, for example, categories of images, and can output a statistical likelihood that an input image falls within one of the categories.

Figure 3:
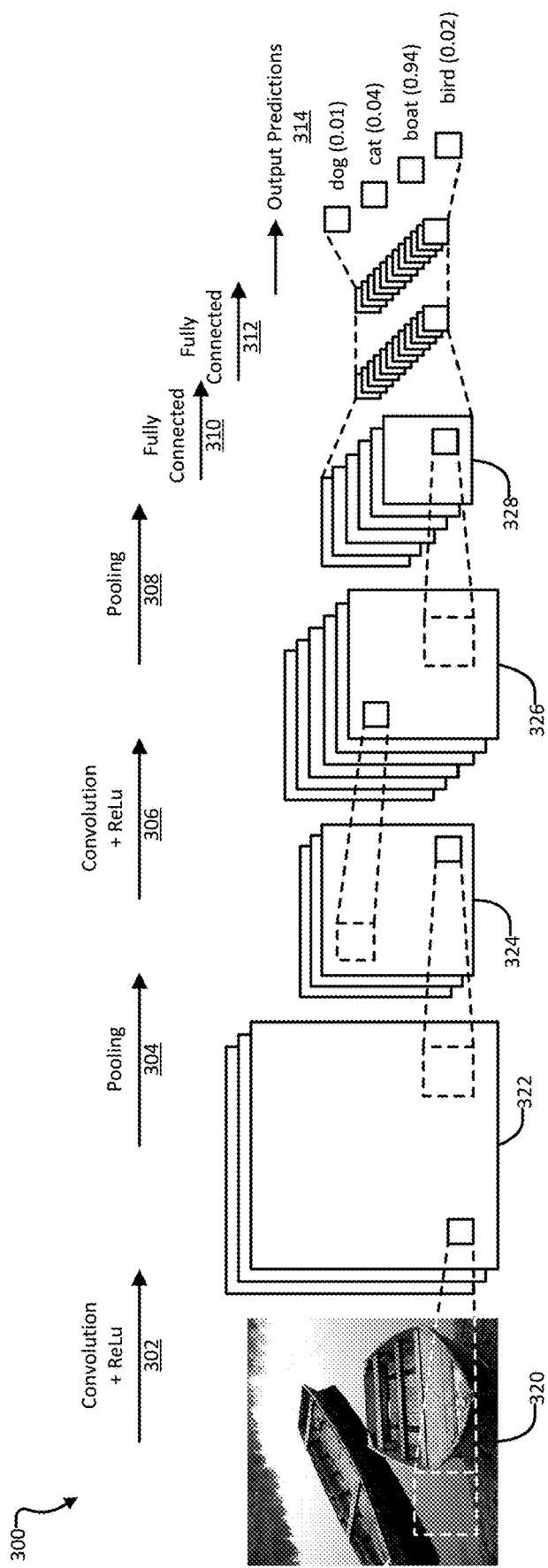
FIG. 3 is a diagram illustrating an example of a model for a convolutional neural network.

FIG. 3 is a diagram illustrating an example of a model 300 for a convolutional neural network. The model 300 illustrates operations that can be included in a convolutional neural network: convolution, activation, pooling or sub-sampling, batch normalization, output generation (e.g., a fully connected layer). Any given convolutional network includes at least one convolution layer, and can have tens of convolution layers. Additionally, each convolutional layer need not be followed by a pooling layer. In some examples, a pooling layer may occur after multiple convolution layers, or may not occur at all. The example convolution network illustrated in FIG. 3 classifies an input image 320 into one of four categories: dog, cat, boat, or bird. In the illustrated example, on receiving an image of a boat as input, the example neural network outputs the highest probability for "boat" (0.94) among the output predictions 314.

To produce the illustrated output predictions 314, the example convolutional neural network performs a first convolution with ReLU 302, pooling 304, a second convolution with ReLU 306, additional pooling 308, and then categorization using two fully-connected layers. In the first convolution with ReLU 302 step, the input image 320 is convoluted to produce one or more output feature maps 322. The first pooling 304 operation produces additional feature maps, which function as input feature maps 324 for the second convolution and ReLU 306 operation. The second convolution and ReLU 306 operation produces a second set of output feature maps 326. The second pooling 308 step also produces feature maps 328, which are input into a first fully-connected 310 layer. The output of the first fully-connected 310 layer is input into a second fully-connect 312 layer. The outputs of the second fully-connected 312 layer are the output predictions 314. In convolutional neural networks, the terms "higher layer" and "higher-level layer" refer to layers further away from the input image (e.g., in the example model 300, the second fully-connected 312 layer is the highest layer).

The example of FIG. 3 is one example of a convolutional neural network. Other examples can include additional or fewer convolution operations, ReLU operations, pooling operations, and/or fully-connected layers. Convolution, non-linearity (ReLU), pooling or sub-sampling, and categorization operations will be explained in greater detail below.

When conducting image recognition, a convolutional neural network operates on a numerical or digital representation of the image. An image can be represented in a computer as a matrix of pixel values. For example, a video frame captured at 1080p is includes an array of pixels that is 1920 pixels across and 1080 pixels high. Certain components of an image can be referred to as a channel. For example, a color image has three channels: red, green and blue. In this example, a color image can be represented as three two-dimensional matrices, one for each color, with the horizontal and vertical axis indicating a pixel's location in the image and a value between 0 and 255 indicating a color intensity for the pixel. As another example, a greyscale image has only one channel, and thus can be represented as a single two-dimensional matrix of pixel values. In this example, the pixel values can also be between 0 and 255, with 0 indicating black and 255 indicating white, for example. The upper value of 255, in these examples, assumes that the pixels are represented by 8-bit values. In other examples, the pixels can be represented using more bits (e.g., 16, 32, or more bits), and thus can have higher upper values.

Convolution is a mathematical operation that can be used to extract features from an input image. Features that can be extracted include, for example, edges, curves, corners, blobs, and ridges, among others. Convolution preserves the spatial relationship between pixels by learning image features using small squares of input data.

Figure 4C:
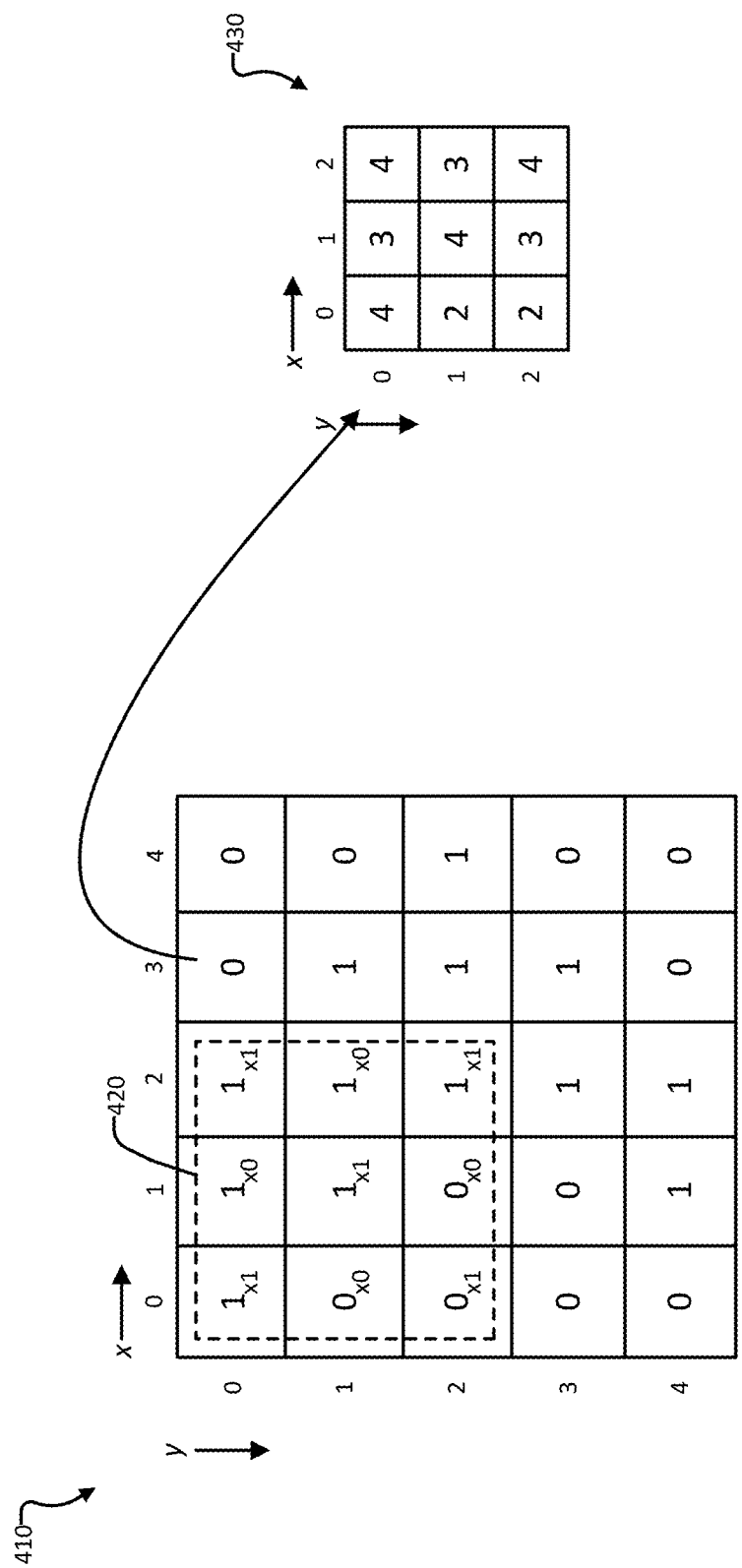

FIG. 4A, FIG. 4B, and FIG. 4C are diagrams illustrating a simple example of a convolution. FIG. 4A illustrates an example input matrix 410 of pixel values. In this example, the input image represented by the input matrix 410 is five pixels wide by five pixels high. For purposes of this example, the pixel value are only 0 and 1. In other examples, the pixel values can range from 0 to 255, as discussed above. Because there is only one input matrix 410, the image has only one channel, and can be assumed to be a greyscale image.

FIG. 4B illustrates an example of a filter 420, which can also be referred to as a kernel or a feature detector. The filter 420 can be used to extract different features from the image, such as edges, curves, corners, and so on, by changing the numeric values in the matrix. In this simplified example, the matrix values are 0 or 1. In other examples, the matrix values can be greater than one, negative, and/or fractional.

FIG. 4C illustrates convolution of the input matrix 410 with the filter 420. The convolution operation involves computing a value for each possible position of the filter 420 over the input matrix 410 by multiplying the input matrix 410 value and the filter 420 value and summing the resulting products. As an example, in the example of FIG. 4C, the filter 420 overlaps (x, y) positions (0, 0), (1,0), (2, 0), (0, 1), (1, 1), (2, 1), (0, 2), (1, 2), and (2, 2) of the input matrix 410. At position (0, 0), for example, the input matrix 410 value is multiplied by the filter 420 value to produce a product of 1. The multiplication is repeated for each position where the filter 420 overlaps with the input matrix 410. The products are then summed to produce a value of 4 for the illustrated filter position.

The value of 4 is placed at a position (0, 0) in a feature map 430, which can also be referred to as a convolved feature or an activation map. The (0, 0) position corresponds to the filter's position, as illustrated in FIG. 4C. To obtain a value for position (1, 0) in the feature map 430, the filter 420 is slid to the right by one pixel, and the multiply-add operation is repeated. To obtain a value for position (0, 1) in the feature map 430, the filter 420 can be moved to overlap positions (0, 1) through (2, 3) in the input matrix 410.

In examples that include more channels, the filter 420 can be applied to the input matrix for each channel. For example, a color image can have three channels, and thus three input matrices. In this example, convolution of the three input matrices can thus result in three feature maps.

In practice, the filter values, which can also be referred to as weights, are determined during training of the neural network. Design of a convolutional neural network thus involves specifying factors such as the number of filters to use, the filter size, and the architecture of the network, including the number of layers and the operation executed in each layer.

The size of the feature maps can be controlled by three parameters: depth, stride, and zero-padding.

Depth corresponds to the number of filters used in a convolution operation. Applying more filters can result in more features being extracted, and the neural network possibly being able to produce a more accurate identification. Each additional filter, however, increases the number of computations that need to be performed. Additionally, each filter results in a separate feature map (or multiple additional feature maps, for a multi-channel image), which requires additional storage space. A set of feature maps extracted in the same convolution network can be thought of as a stack of two-dimensional matrices, sometimes collectively referred to as a single feature map. The depth of the feature map is thus the number of the two-dimensional matrices.

The stride is the number of pixels by which a filter matrix is moved across an input matrix. In the example of FIG. 4C, the filter 420 matrix was moved by one pixel at a time, thus the stride was one. When the stride is, for example, two, the filter moves two pixels between computations. A larger stride results in a smaller feature map.

In the example of FIG. 4C, some information at the edges of the input matrix 410 may not be well captured. This is because, in this example, the filter is applied to some positions once (e.g., position (0, 0)) or twice (e.g., position (0, 1)), while the filter is applied four times to all other positions. In some cases, loss of edge information is acceptable. When it is not desirable to lose edge information, zero-padding may be applied, meaning that the input matrix is increased in size in all directions by the same amount of pixels and the new positions are given a value of zero. Zero-padding can also be used to control the size of the feature maps. Addition of zero-padding can be referred to as wide convolution, while not using zero-padding can be referred to as narrow convolution.

In some cases, an operation referred to as ReLU is applied to a feature map. ReLU, which stands for Rectified Linear Unit, is one type of activation layer. ReLU is a non-linear operation, whose output is given by:

$$\text{Output}=\text{Max}(0,\text{Input})$$

ReLU is an element-wise operation applied to each pixel. ReLU replaces all negative pixel values in a feature map by zero. Convolution is a linear operation: element-wise matrix multiplication and addition. ReLU introduces non-linearity into a convolutional neural network on the assumption that most of the real-world data the convolutional neural network is to learn about is non-linear. Other non-linear functions can be used, such as tan h or sigmoid.

A convolutional neural network can also include pooling, which can also be referred to as sub-sampling or down sampling. Pooling reduces the dimensionality of a feature map while retaining the most important information. Various pooling functions can be used, such as max, average, sum, and others.

Figure 5:
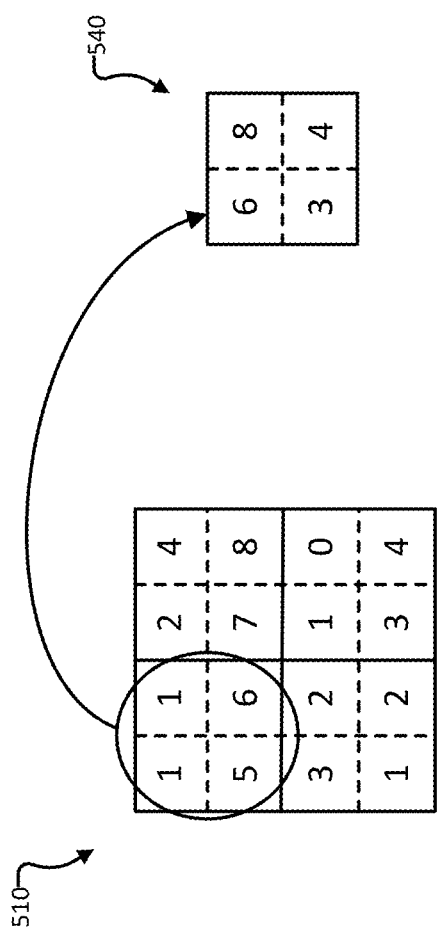
FIG. 5 is a diagram illustrating an example of max pooling applied to a rectified feature map.

FIG. 5 is a diagram illustrating an example of max pooling applied to a rectified feature map 510; that is, a feature map to which ReLU or another non-linear function has been applied. In the example of FIG. 5, a spatial neighborhood of two pixels wide by two pixels high has been defined. Within the 2×2 window, the maximum value is taken and placed in the pooled feature map 540. Also in this example, the window is moved by two pixels (also referred to as a stride of two) for each max operation, resulting in the 4×4 rectified feature map 510 being reduced to a 2×2 pooled feature map 540. In other examples, an average of the values in the window can be computed for the pooled feature map 540, or a sum, or some other computation. Max pooling is most commonly used.

When a pooling operation is applied, the operation is applied separately to each feature map output from a convolution layer (or a convolution and ReLU layer). The number of pooled feature maps from a pooling layer is thus the same as the number of feature maps that are input into the pooled layer.

A convolutional neural network can include pooling to progressively reduce the spatial size of the input representation. For example, pooling can make the input representations (e.g., the feature dimension) smaller and more manageable. As another example, pooling can reduce the number of parameters and computations that need to be performed by the neural network. As another example, pooling can make the neural network invariant to small transformations, distortions, or translations in the input image. That is, a small distortion in the input is not likely to change the output of the pooling, since the maximum (or average, or sum, or some other operation) is taken in a local neighborhood. As a further example, pooling can assist in determining an almost scale invariant representation of the image (referred to as an equivariant representation). This means that an object can be detected in an image no matter where the object is located within the image.

As illustrated by the example of FIG. 3, a convolutional neural network can include multiple convolution layers, with each layer refining the features extracted by a previous layer. Each convolution layer may be, but need not be, followed by pooling. The output of a combination of these layers represent high-level features of the input image, such as the presence of certain shapes, colors, textures, gradients, and so on.

To turn these feature maps into a classification, a convolutional neural network can include one or more fully-connected layers. A Multi-Layer Perceptron that uses, for example, a softmax activation function can be used after a fully-connected layer. A fully-connected layer can classify the input image into various classes based on training data. For example, the convolutional neural network of FIG. 3 was trained to recognize dogs, cats, boats, and birds, and can classify an input image as including one of these classes.

Apart from classification, a fully-connected layer in a convolutional neural network might also provide an inexpensive (in computational and/or data storage terms) way to learn non-linear combinations of the extracted features. The features extracted by the convolution and pooling layers may be good for making a classification, but combination of the features may be better.

In the example of FIG. 3, the sum of the output predictions 314 is 1, due to the output layer using softmax activation function. The softmax function takes a vector of arbitrary real-valued scores and compresses these values into a vector of values between zero and one that add up to one.

As noted above, the filter values are determined during training of the convolutional neural network. Training can be accomplished, for example, using a backpropagation technique. This technique involves, first, initializing all filter values and any related parameters with random values. Second, a training image can be input into the neural network. In this step, because the weights were randomly assigned, the output probabilities likely will also be random. For example, the output vector for the neural network of FIG. 3 might be [0.2, 0.4, 0.1, 0.3], representing the probability that the training image is a dog, cat, boat, or bird, respectively.

Next, a total error at the output layer can be calculated, as follows:

$$\text{Total Error} = \sum \frac{(\text{target probablity} - \text{output probablity})^2}{2}$$

In the above equation, the target probability is a vector representing the desired outcome. For example, for the input image 320 illustrated in FIG. 3, the target probabilities is [0, 0, 1, 0].

The fourth step is to use backpropagation to calculate gradients of error with respect to all weights in the neural network. Further, gradient descent can be used to update all filter values or weights and parameter values, to minimize the output error. For example, a weight can be adjusted in proportion to the weight's contribution to the total error. When the same training image is input again, the output vector might be closer to the target probabilities. Back propagation can be repeated until the output vector is within a desired range of the target probability. The training steps can further be repeated for each image in a training data set.

In the training processes, parameters such as the number of filters, the filter sizes, and the organization of the layers remain unchanged. During training, only the values of the filter matrices and connection weights are changed.

Research has found that the more convolution steps a neural network has, the more features the network will be able to learn to recognize. For example, in an image classification example, in a first layer, the neural network may learn to detect edges from the raw pixels, then in a second layer use the edges to detect shapes, and in a third layer, the neural network may be able to use the shapes to determine higher-level features, such as facial shapes, in higher layers.

Figure 6:
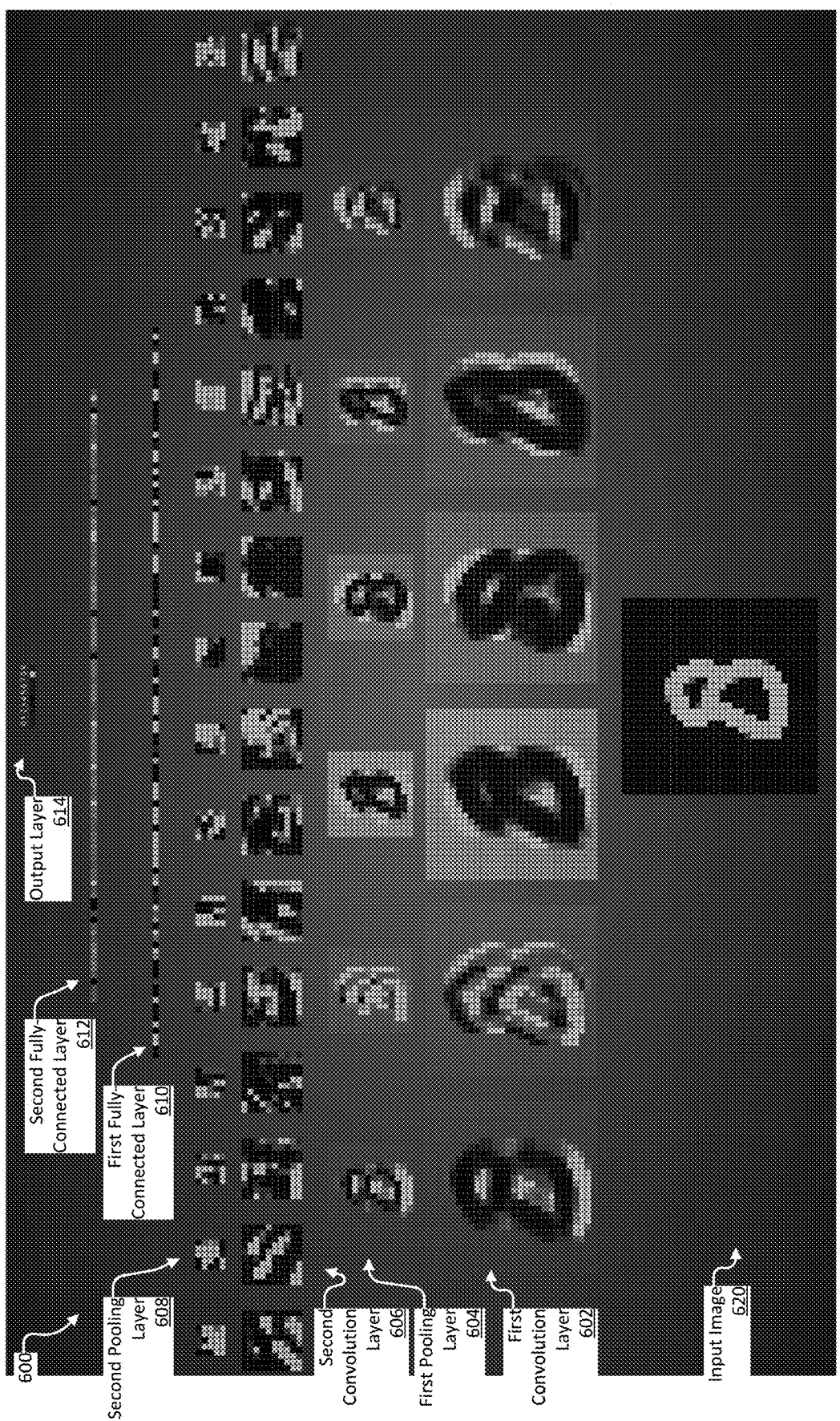
FIG. 6 illustrates an example visualization of a convolutional neural network that has been trained to recognize numbers.

FIG. 6 illustrates an example visualization 600 of a convolutional neural network that has been trained to recognize numbers. In this example, the ReLU operation is not shown separately. In the example of FIG. 6, the input image 620 is 32 pixels high and 32 pixels wide. The first convolution layer 602 performs a convolution on the input image 620 using six different 5×5 filters applied with a stride of one. The output of the first convolution layer 602 is a feature map with a depth of six.

The first convolution layer 602 is followed by a first pooling layer 604. The first pooling layer 604 executes 2×2 max pooling with a stride of two over each of the six feature maps produced by the first convolution layer 602. The output of the first pooling layer 604 is six feature maps that have a lower resolution than the input feature maps, but that more distinctly identify a feature. For example, use of the max function means that the pixels having the maximum value (e.g. the brightest pixel) in each 2×2 region of the input feature maps is put into the output feature maps.

The first pooling layer is followed by a second convolution layer 606. In the second convolution layer 606, sixteen 5×5 filters are applied with a stride of 1, producing an output feature map with a depth of 16. A second pooling layer 608 does 2×2 max pooling with a stride of two, similar to the first pooling layer 604.

The convolutional neural network used to generate the visualization 600 next has three fully-connected layers, including the output layer 614. The fully-connected layers can be used to categorize the outputs (in this example) of the second pooling layer 608. In the example of FIG. 6, the first fully-connected layer 610 has 120 nodes or neurons and the second fully-connected layer has 100 nodes. The output layer 614 has 10 neurons that correspond to the ten possible digits the network was trained to recognize. Though not illustrated here, because the layers are fully-connected, each node of the first fully-connected layer 610 is connected to each node in the second fully-connected layer 612. Similarly, each node in the second fully-connected layer 612 is connected to each node in the output layer 614.

To categorize the input image 620, in the illustrated example, first fully-connect layer 610 can treat the two-dimensional inputs as a single list of values. The training process may have determined that some values from the list are more accurate at predicting a category, and these values are given a higher weight, which are assigned at the inputs of the nodes of the first fully-connected layer 610. Each node of the first fully-connect layer 610 can thus produce a weighted sum of the inputs to the node. The second fully-connected layer 612 conducts a similar process with the list of values output from the first fully-connected layer 610. The second fully-connected layer 612 can also assign weights to the inputs of each node in the layer. The output layer 614 also conducts a similar process. The brightest node (e.g., having the highest value) in the output layer 614 corresponds to the number 8, indicating that the neural network has correctly identified the numeral drawn in the input image 620.

As can be seen in the example of FIG. 6, higher-level feature maps in a convolutional neural network have a stronger semantic representation, meaning that the higher-level feature maps can identify a more complex feature (e.g., a facial shape as opposed to an edge). The higher-level features maps, however, may lose spatial information that can enable a convolutional neural network to correctly identify some objects, such as small objects. For example, as can be seen in FIG. 6, due to the filtering and pooling operations, higher-level feature maps have a lower resolution (e.g., fewer pixels per feature map) than do the lower-level feature maps. Having a lower resolution may mean that a higher-level feature map more definitively identifies a feature, but may also mean that the location of the feature within the input image is not clear.

Figure 7:
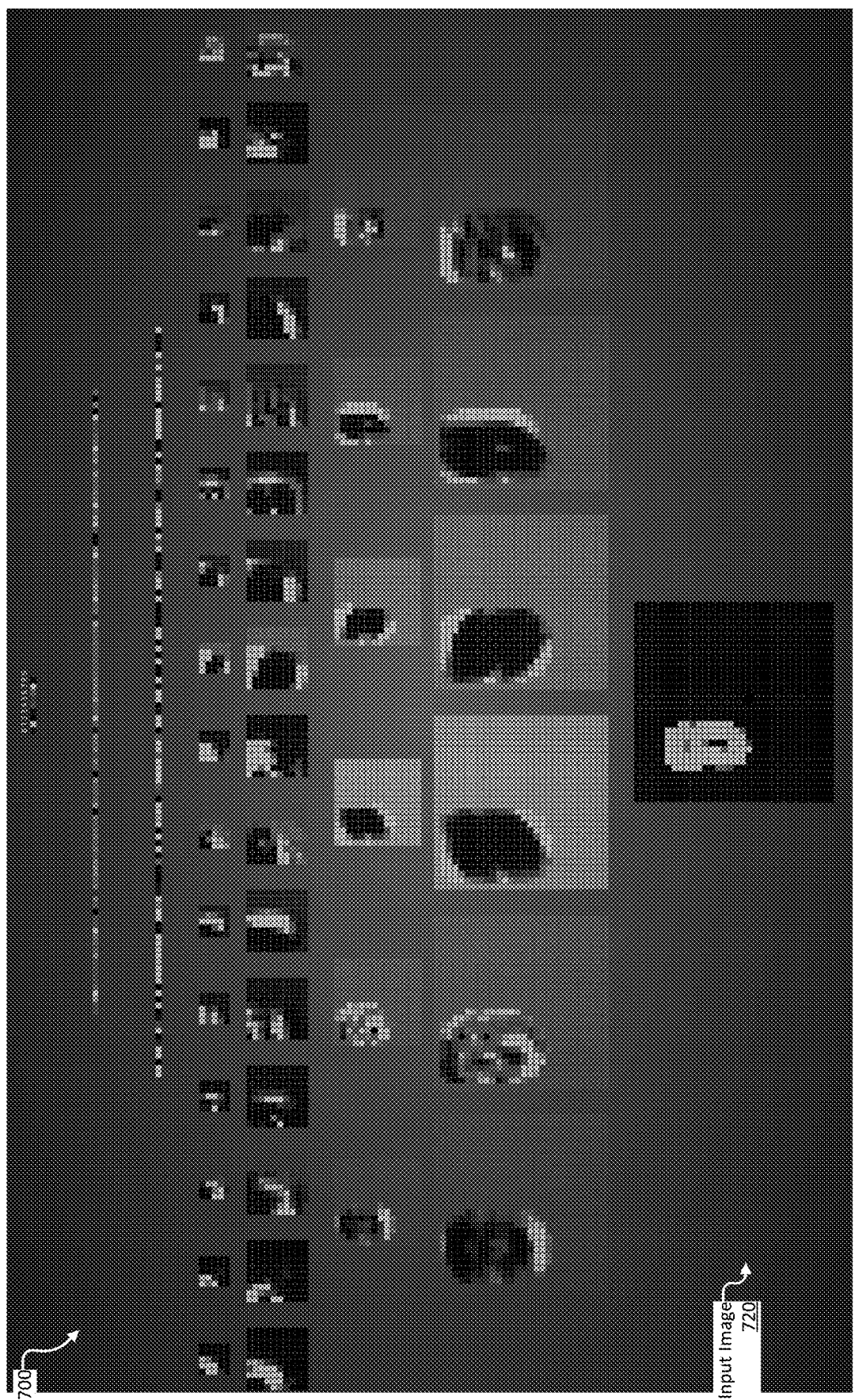
FIG. 7 illustrates a visualization in which a neural network has incorrectly identified an input.

FIG. 7 illustrates a visualization 700 using the same neural network used to produce the visualization 600 of FIG. 6. In the example of FIG. 7, the neural network has incorrectly classified the input image 720 as being of a 1 or possibly a 7, instead of being of an 8. This incorrect classification may have been due to the character having been drawn smaller and/or off center. Incorrect classification may also occur if the character is drawn sideways or (in the case of characters other than 1, 6, 8, and 9) upside-down.

In various implementations, a neural network architecture can generate feature maps that preserve spatial information while having strong semantic representations. In various implementations, the neural network architecture includes one or more deconvolution operations, performed in deconvolution layers. Higher-level feature maps, which can have a lower resolution than lower-level feature maps, can be up-sampled or up-scaled using a deconvolution operation implemented in a deconvolution layer. The higher-resolution feature maps produced by a de-convolutional layer can then be combined with feature maps, of the same resolution, produced by the convolution layers. The combine feature maps can then be used to determine an output prediction.

FIG. 8A through FIG. 8E illustrate a graphical example of a neural network architecture that includes deconvolution in order to preserve spatial information. In this example, an input image 800 is processed through a series of five convolution layers, where the convolution layers perform operations as described above. The feature maps produced by convolution 812 will be referred to herein as non-combined feature maps or initial feature maps. The first non-combined feature map 802 produced by the neural network is $x_0$ pixels wide and high. The first non-combined feature map 802 is convolved in a second convolution layer into a second non-combined feature map 804 that is $x_1$ pixels wide and high. In this example, the neural network has three additional convolution layers that can produce a third non-combined feature map 806 that is $x_2$ pixels wide and high, a fourth non-combined feature map 808 that is $x_3$ pixels wide and high, and a fifth non-combined feature map 810 that has the strongest semantic information (e.g., represents a complex feature) and the lowest resolution. Pooling may occur between one or more of the convolution layers, but is not illustrated here. In this example, the image has only one channel (e.g., the image is in black and white) and application of only one filter per convolution layer is illustrated, so that each non-combined feature map has a depth of one. The concepts discussed further below can also be applied to input images that have multiple channels, and can be applied to multiple feature maps produced by each convolution layer.

In various implementations, a deconvolution operation 820 can be used to preserve spatial information, and produce a more accurate prediction. The deconvolution operation 820 up-samples or up-scales an input matrix, essentially performing the opposite of a convolution though not necessarily reconstructing a convolved input matrix. With proper selection of a filter and stride, deconvolution can produce an output matrix that is the same size (e.g., the same number of pixels high and wide) as was the matrix that was input into a corresponding convolution. For example, a 5×5 matrix can be convolved into a 3×3 matrix, and the 3×3 matrix can be de-convolved to produce a 5×5 matrix. Increasing the resolution of a convolved input matrix can restore spatial information that was lost by the convolution operation by virtue of the de-convolved matrix having more pixels to represent the data. The information in the de-convolved can depend on the filter parameters used in the deconvolution.

Figure 8A:
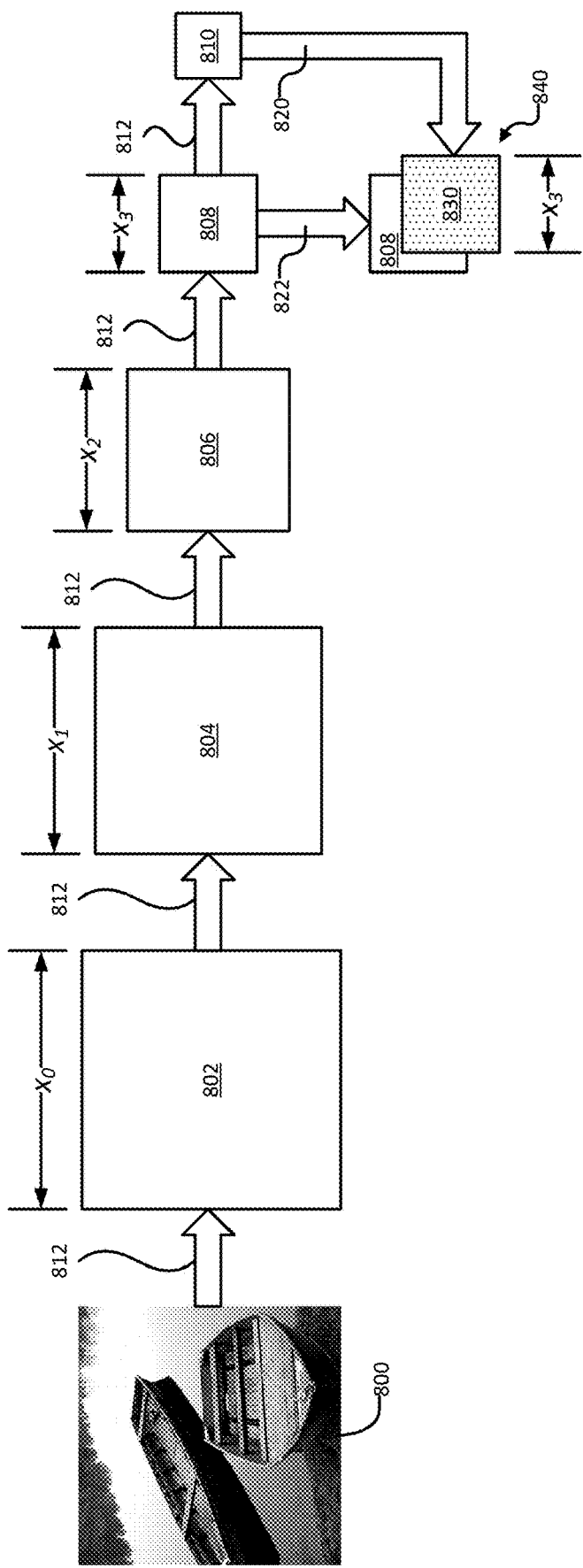
FIG. 8A through FIG. 8E illustrate a graphical example of a neural network architecture that includes deconvolution in order to preserve spatial information.

In the example of FIG. 8A, the fifth non-combined feature map 810 undergoes the deconvolution operation 820 to produce what will be referred to as an up-sampled feature map (e.g., a first up-sampled feature map 830). The first up-sampled feature map 830 is produced such that the first up-sampled feature map 830 is $x_3$ pixels high and wide; that is, the same size as the fourth non-combined feature map 808. In some implementations, ReLU is performed on the first up-sampled feature map 830. In some implementations, ReLU is not performed on the first up-sampled feature map 830, and these implementations have been found to produce more accurate prediction results.

The first up-sampled feature map 830 may have the strong semantic information of the fifth non-combined feature map 810 but at the resolution of the fourth non-combined feature map 808. Thus, the first up-sampled feature map 830 can be combined with the fourth non-combined feature map 808 to improve the semantic information of the fourth non-combined feature map 808. The first up-sampled feature map 830 and the fourth non-combined feature map 808 can be combined to produce what will be referred to herein as a combined feature map. As illustrated in FIG. 8A, combining the first up-sampled feature map 830 with the fourth non-combined feature map 808 produces a first combined feature map 840.

The first up-sampled feature map 830 can be combined with the fourth non-combined feature map 808 using, for example, a concatenation operation 822. As illustrated by this example, concatenation "stacks" an up-sampled feature map on top of (or underneath) a corresponding non-combined feature map. For example, the first up-sampled feature map 830 is combined with the fourth non-combined feature map 808 by stacking the data from the first up-sampled feature map 830 on top of the data from the fourth non-combined feature map 808. The first up-sampled feature map 830 can also be stacked underneath the fourth non-combined feature map 808. Concatenation increases the depth of a feature map from, for example, a $1 \times x_0 \times x_0$ matrix to a $2 \times x_0 \times x_0$ matrix. Values in the non-combined feature map are not changed, nor are values in the up-sampled feature maps. Thus, the semantic information from the non-combined feature maps is available simultaneously with the spatial information from the up-sampled feature maps.

In other examples, other operations can be used to combine a non-combined feature map with an up-sampled feature map. For example, a max, average, sum, or other operation can be used to combine the non-combined feature map with the up-sampled feature map. In these examples, the depth of the combined feature map may be the same as the depth of the non-combined feature map.

In some implementations, the first combined feature map 840 can be used to conduct object identification. For example, the first combined feature map 840 can be input into a fully-connected layer to produce a classification. In some examples, the first combined feature map 840 and the fifth non-combined feature map 810 can be used to compute a classification.

Figure 8B:
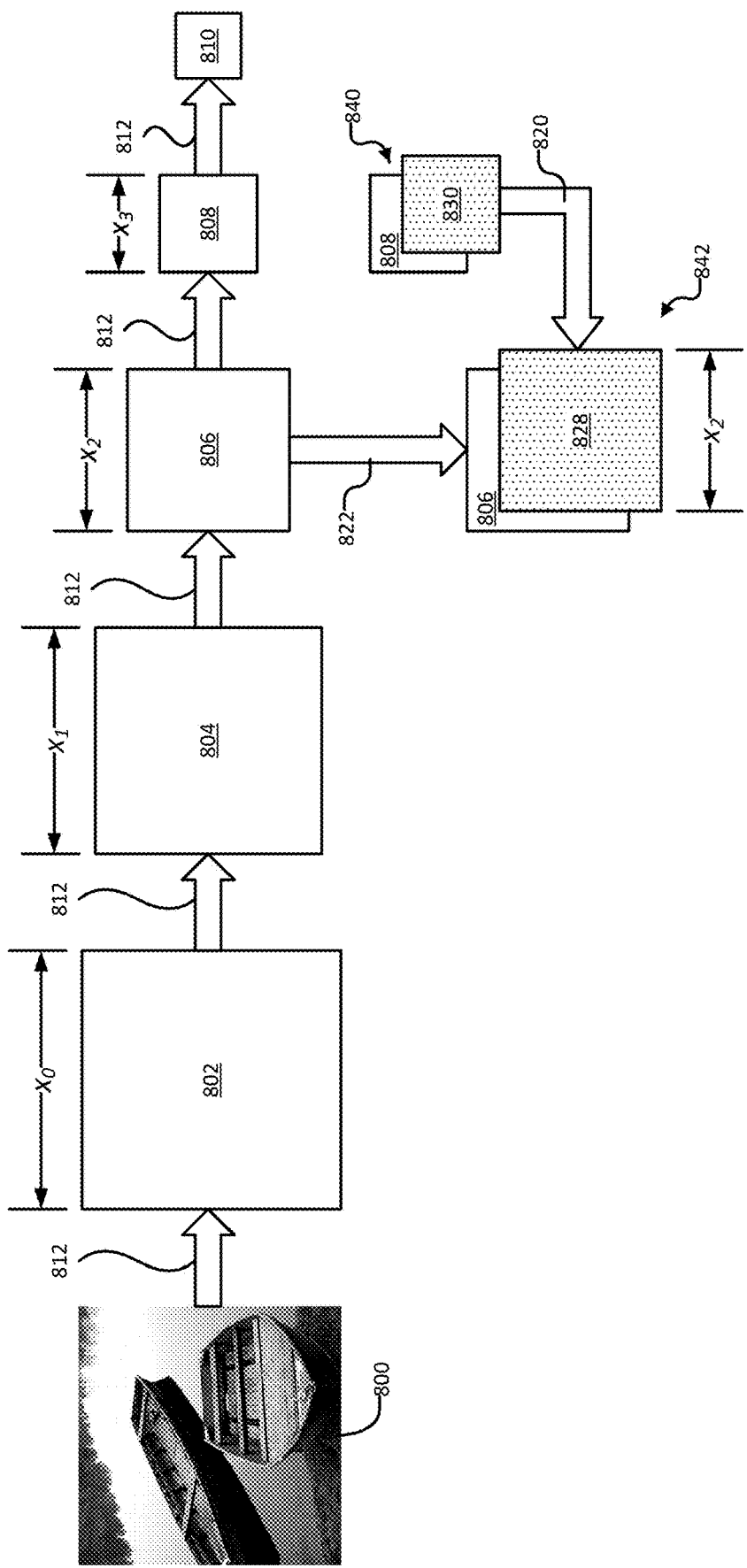

In some implementations, the neural network architecture can include additional deconvolutions to produce additional combined feature maps. The additional feature maps can further improve the prediction accuracy of the neural network. FIG. 8B illustrates an example of a procedure for producing additional combined feature maps. In this example, the first combined feature map 840 undergoes a deconvolution operation 820 to generate a second up-sampled feature map 828 that has the same height and width $x_2$ of the third non-combined feature map 806. Because the first combined feature map 840 includes the semantic information of the first up-sampled feature map 830 and the spatial information of the fourth non-combined feature map 808, the second combined feature map 842 can include both good semantic and spatial information. The first combined feature map 840 can thus be combined with the third non-combined feature map 806 (for example using a concatenation operation 822) to produce a second combined feature map 842, which improves on the semantic information of the third non-combined feature map 806.

Figure 8C:
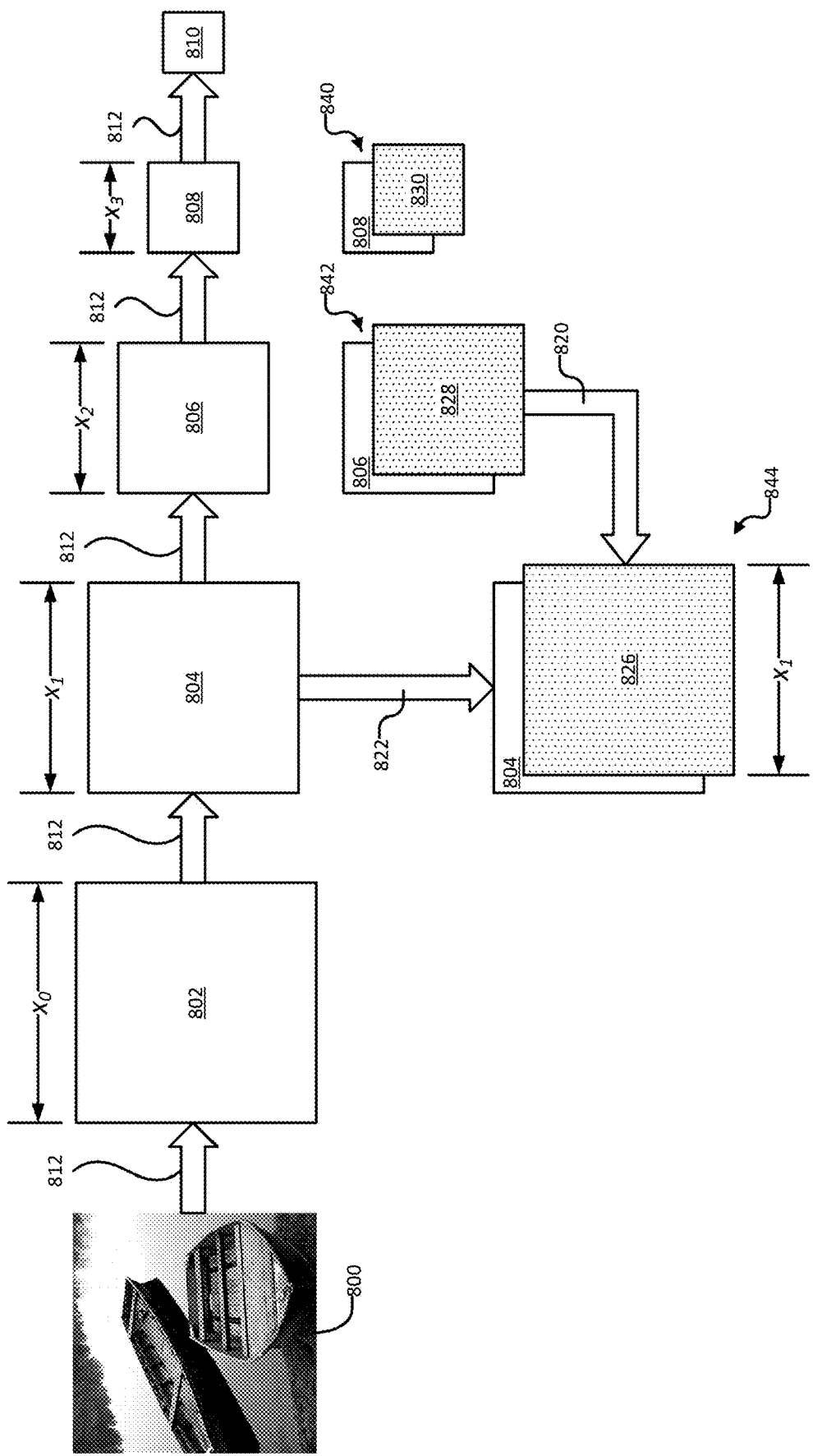
Figure 8D:
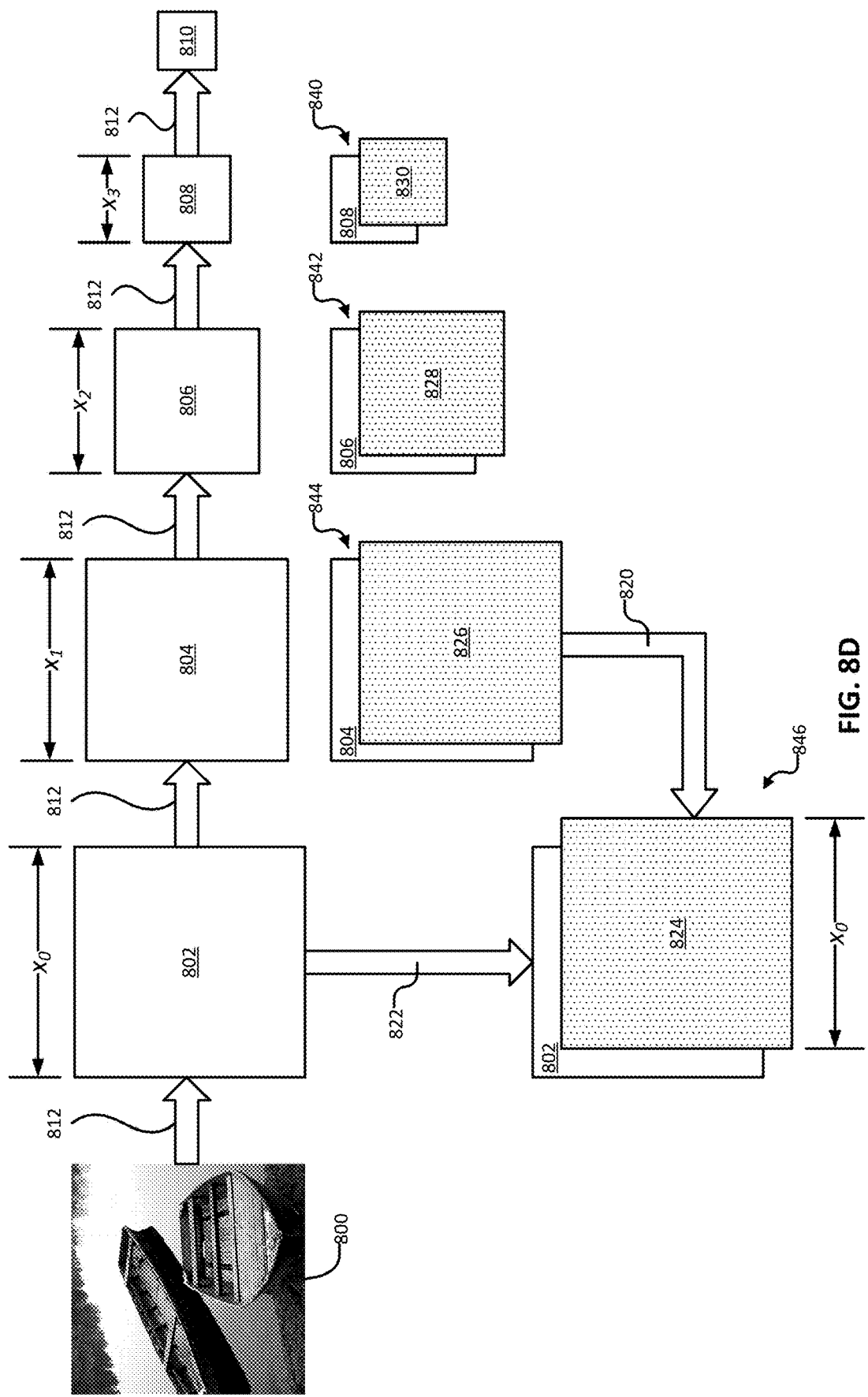

In some implementations, the procedure illustrated in FIG. 8B can be repeated for each non-combined feature map. In FIG. 8C, the second combined feature map 842 undergoes a deconvolution operation 820 to produce a third up-sampled feature map 826 that has a same height and width $x_2$ as the second non-combined feature map 804. The third up-sampled feature map 826 can be combined with the second non-combined feature map 804 to produce a third combined feature map 844. In FIG. 8D, the third combined feature map 844 undergoes a deconvolution operation 820 to produce a fourth up-sampled feature map 824. The fourth up-sampled feature map 824 is then combined with the first non-combined feature map 802 to produce a fourth combined feature map 846.

Figure 8E:
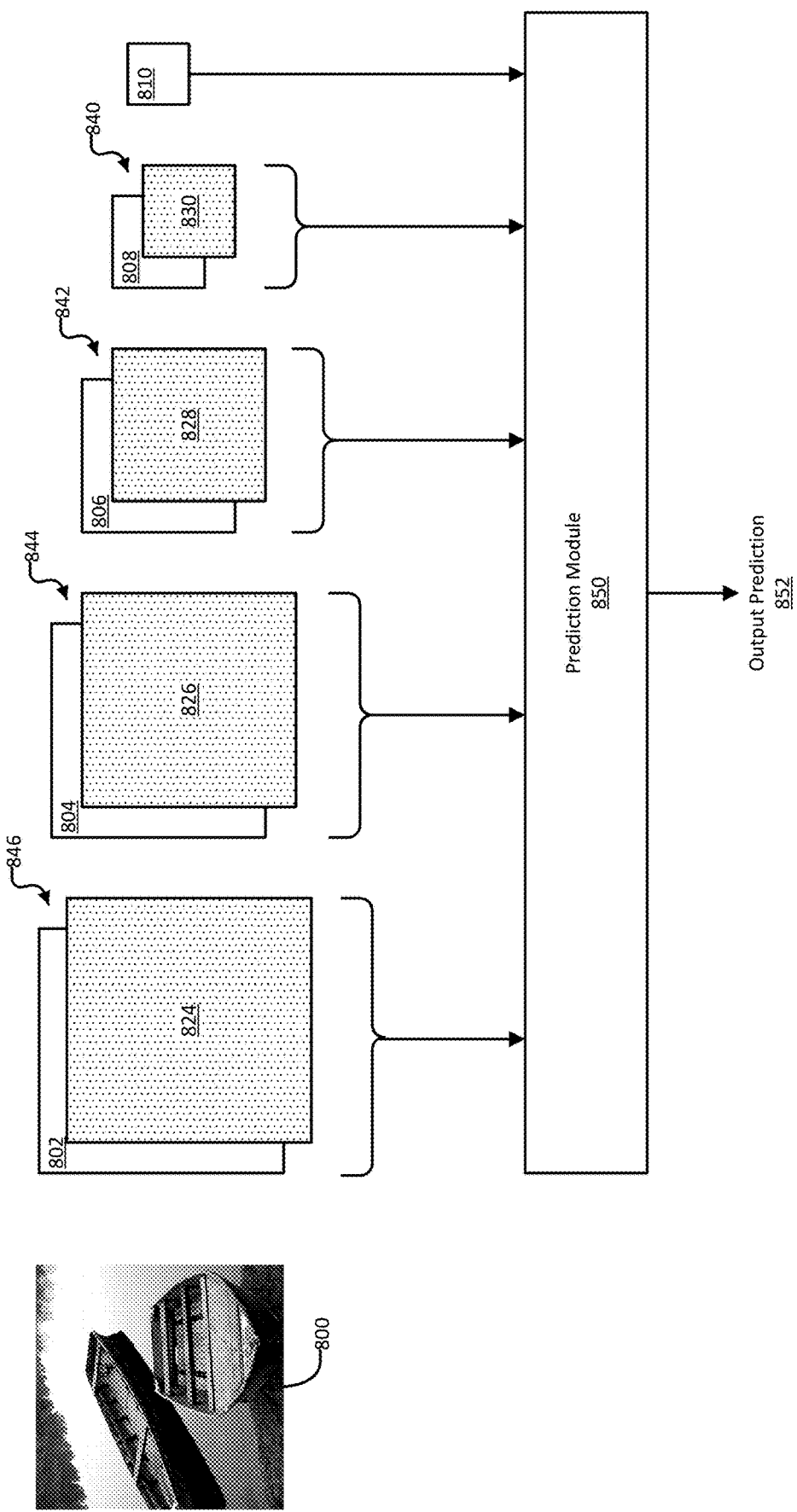

In various implementations, the combined feature maps can be used to make an output prediction 852, as illustrated in the example of FIG. 8E. In some implementations, the fifth non-combined feature map 810 and all of the combined feature maps can be input into a prediction module 850, which can determine a output prediction 852. The prediction module 850 can include, for example, convolution, batch normalization, and/or pooling operations. In some implementations, only some of the combined feature maps are input into the prediction module 850. For example, in some implementations, only the first combined feature map 840 plus the fifth non-combined feature map 810 are input into the prediction module 850.

Figure 9A:
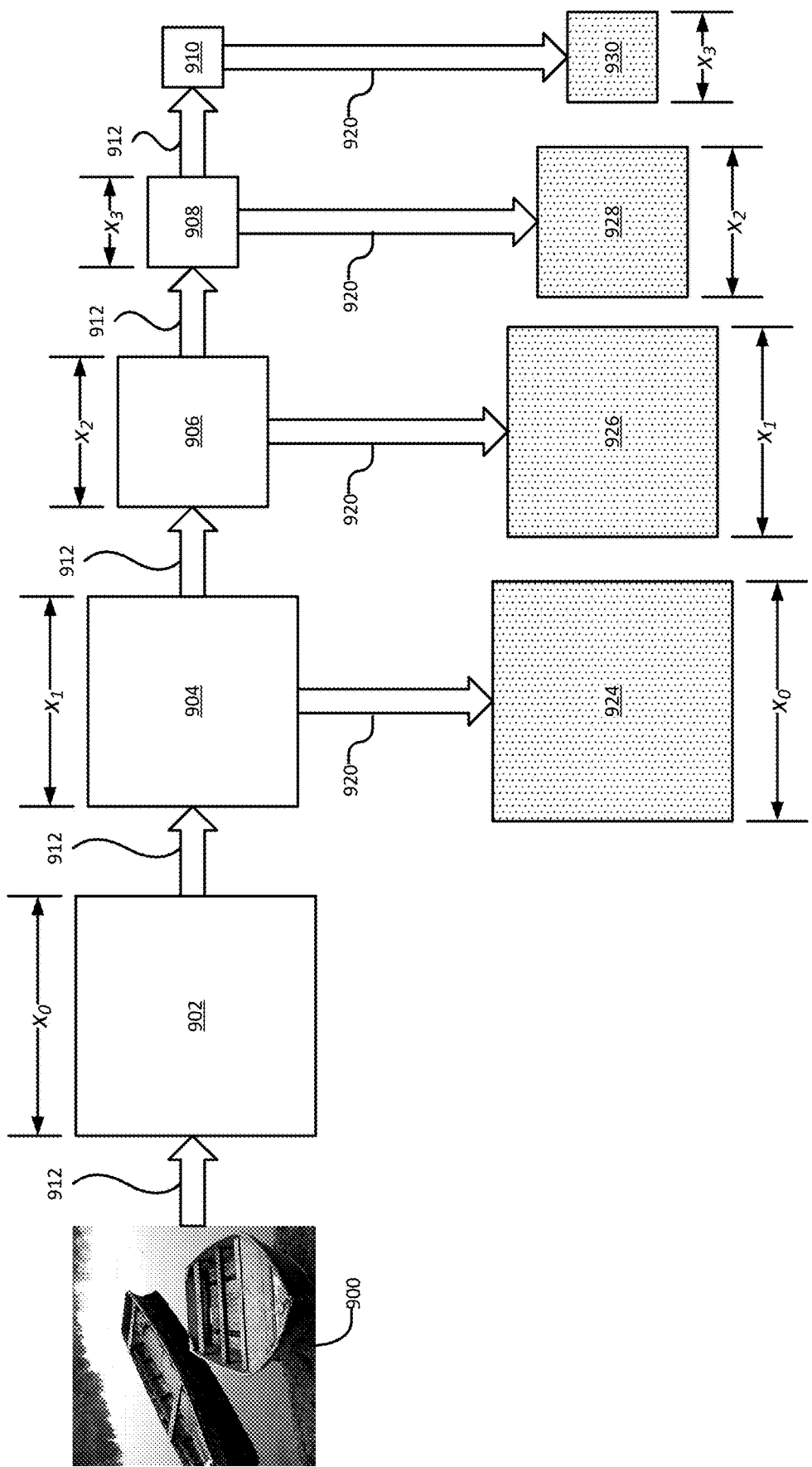
FIG. 9A illustrates a graphical example of a neural network architecture that includes deconvolution in order to preserve spatial information.

FIG. 9A illustrates a graphical example of a neural network architecture that includes deconvolution in order to preserve spatial information. In the example of FIG. 9A, an input image 900 is processed through a series of five convolution layers, where the convolution layers perform operations as described above. The feature maps produced by convolution 912 will be referred to herein as non-combined feature maps or initial feature maps. The first non-combined feature map 902 produced by the neural network is $x_0$ pixels wide and high. In some examples, the first non-combined feature map may have a width that is different from the height, such as when the input image is not square and/or a non-square filter is used. The first non-combined feature map 902 is convolved in a second convolution layer into a second non-combined feature map 904 that is $x_1$ pixels wide and high. In this example, the neural network has three additional convolution layers that can produce a third non-combined feature map 906 that is $x_2$ pixels wide and high, a fourth non-combined feature map 908 that is $x_3$ pixels wide and high, and a fifth non-combined feature map 910 that has the strongest semantic information (e.g., represents a complex feature) and the lowest resolution. Pooling may occur between one or more of the convolution layers, but is not illustrated here. In this example, the input image 900 has only one channel (e.g., the image is in black and white) and application of only one filter per convolution layer is illustrated. The concepts discussed further below can also be applied to input images that have multiple channels, and can be applied to one or more feature maps produced by each convolution layer.

In various implementations, to preserve spatial information, one or more of the non-combined feature maps can be de-convolved using a deconvolution layer. The deconvolution operation 920 up-samples or up-scales an input matrix, essentially performing the opposite of a convolution though not necessarily reconstructing a convolved input matrix. With proper selection of a filter and stride, deconvolution can produce an output matrix that is the same size (e.g., the same number of pixels high and wide) as was the matrix that was input into a corresponding convolution. For example, a 5×5 matrix can be convolved into a 3×3 matrix; the 3×3 matrix can subsequently be de-convolved, with the proper filter, into a 5×5 matrix. Increasing the resolution of a convolved input matrix can restore spatial information that was lost by the convolution operation by virtue of the de-convolved matrix having more pixels to represent the data. The information in the de-convolved can depend on the filter parameters used in the deconvolution.

In the example of FIG. 9A, the fifth non-combined feature map 910 undergoes the deconvolution operation 920 to produce what will be referred to as an up-sampled feature map (e.g., a first up-sampled feature map 930). The first up-sampled feature map 930 is produced such that the first up-sampled feature map 930 is $x_3$ pixels high and wide; that is, the same size as the fourth non-combined feature map 908. In a similar fashion, the fourth non-combined feature map 908 can undergo a deconvolution operation 920 to produce a second up-sampled feature map 928 that is $x_2$ pixels. The second up-sampled feature map 928 can be produced with a different deconvolution layer than is used to produce the first up-sampled feature map 930, such that the second up-sampled feature map 928 can be produced using a different filter and/or different parameters.

In this example, a third up-sampled feature map 926 is also produced from the third non-combined feature map 906, and a fourth up-sampled feature map 924 is produced from the second non-combined feature map 904. The third up-sampled feature map 926 has the same resolution (e.g., is the same size as) the second non-combined feature map 904, and the fourth up-sampled feature map 924 is the same size as the first non-combined feature map 902.

In other examples, the neural network can produce fewer up-sampled feature maps. For example, only one up-sampled feature map can be produced using just the highest-layer feature map. In this example, it may be that the output prediction is made with just the fifth non-combined feature map 910, and a combined version of the fourth non-combined feature map 908 and the first up-sampled feature map 930 (as discussed further below). In the example illustrated in FIG. 9A, it may be that one or more of the non-combined feature maps, in combination with the up-sampled feature maps, is used to generate the output prediction.

Figure 9B:
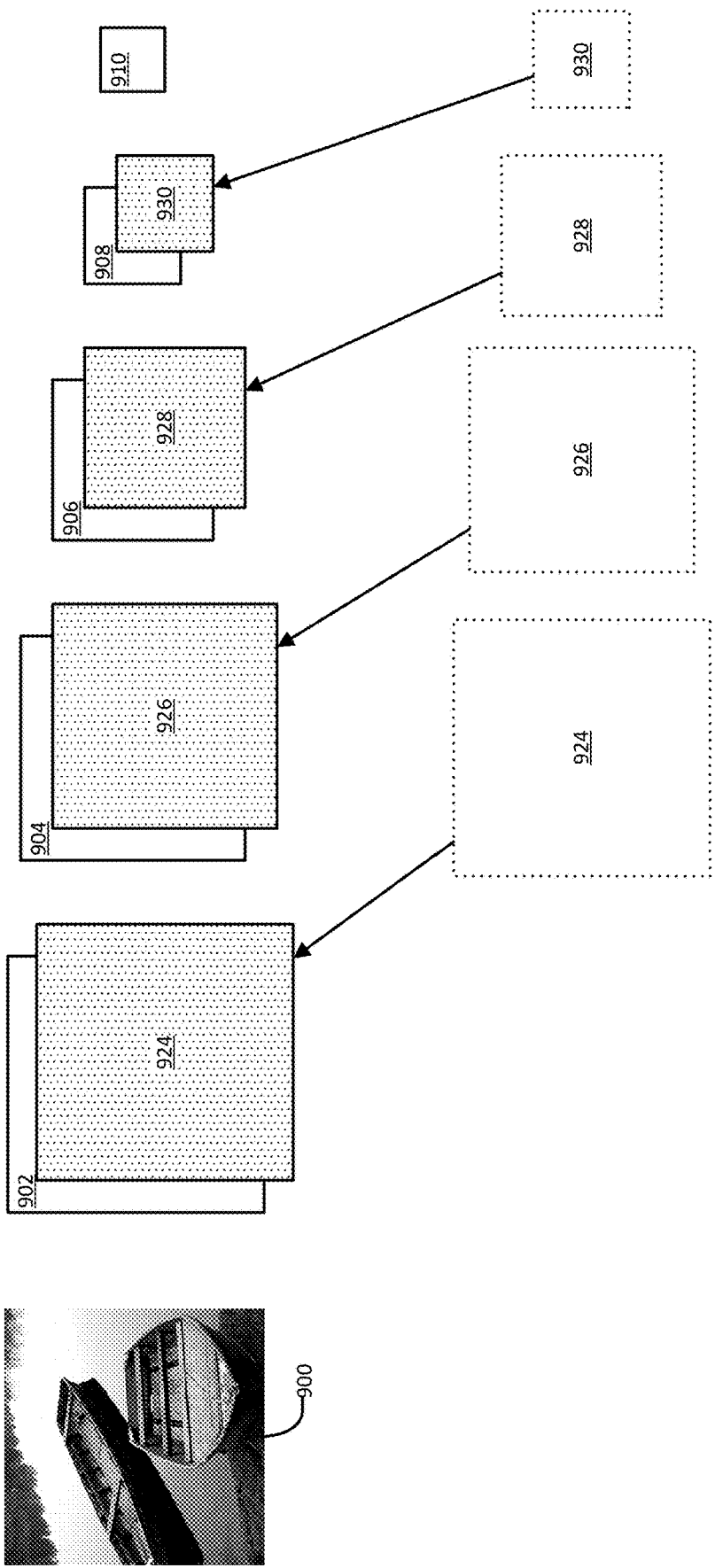
FIG. 9B illustrates a graphical example where the up-sampled feature maps are combined with the non-combined feature maps using a concatenation operation.

Once the up-sampled feature maps are produced, in various implementations, the neural network can combine each up-sampled feature map with a non-combined feature map of the same size. FIG. 9B illustrates a graphic example where the up-sampled feature maps are combined with the non-combined feature maps using a concatenation operation. As illustrated by this example, concatenation "stacks" an up-sampled feature map on top of (or underneath) a corresponding non-combined feature map. For example, the first up-sampled feature map 930 is combined with the fourth non-combined feature map 908 by stacking the data from the first up-sampled feature map 930 on top of the data from the fourth non-combined feature map 908. The first up-sampled feature map 930 can also be stacked underneath the fourth non-combined feature map 908. Similarly, in the illustrated example, the second up-sampled feature map 928 is stacked on top of the third non-combined feature map 906, the third up-sampled feature map 926 is stacked on top of the second non-combined feature map 904, and the fourth up-sampled feature map 924 is stacked on top of the first non-combined feature map 902.

In this example, concatenation increases the depth of a feature map from, for example, a $1 \times x_0 \times x_0$ matrix to a $2 \times x_0 \times x_0$ matrix. Values in the non-combined feature map are not changed, nor are values in the up-sampled feature maps. Thus, the semantic information from the non-combined feature maps is available simultaneously with the spatial information from the up-sampled feature maps.

In various implementations, other operations can be used to combine a non-combined feature map with an up-sampled feature map. For example, a max, average, sum, or other operation can be used to combine the non-combined feature map with the up-sampled feature map. In these examples, the depth of the combined feature map may be the same as the depth of the non-combined feature map.

Figure 9C:
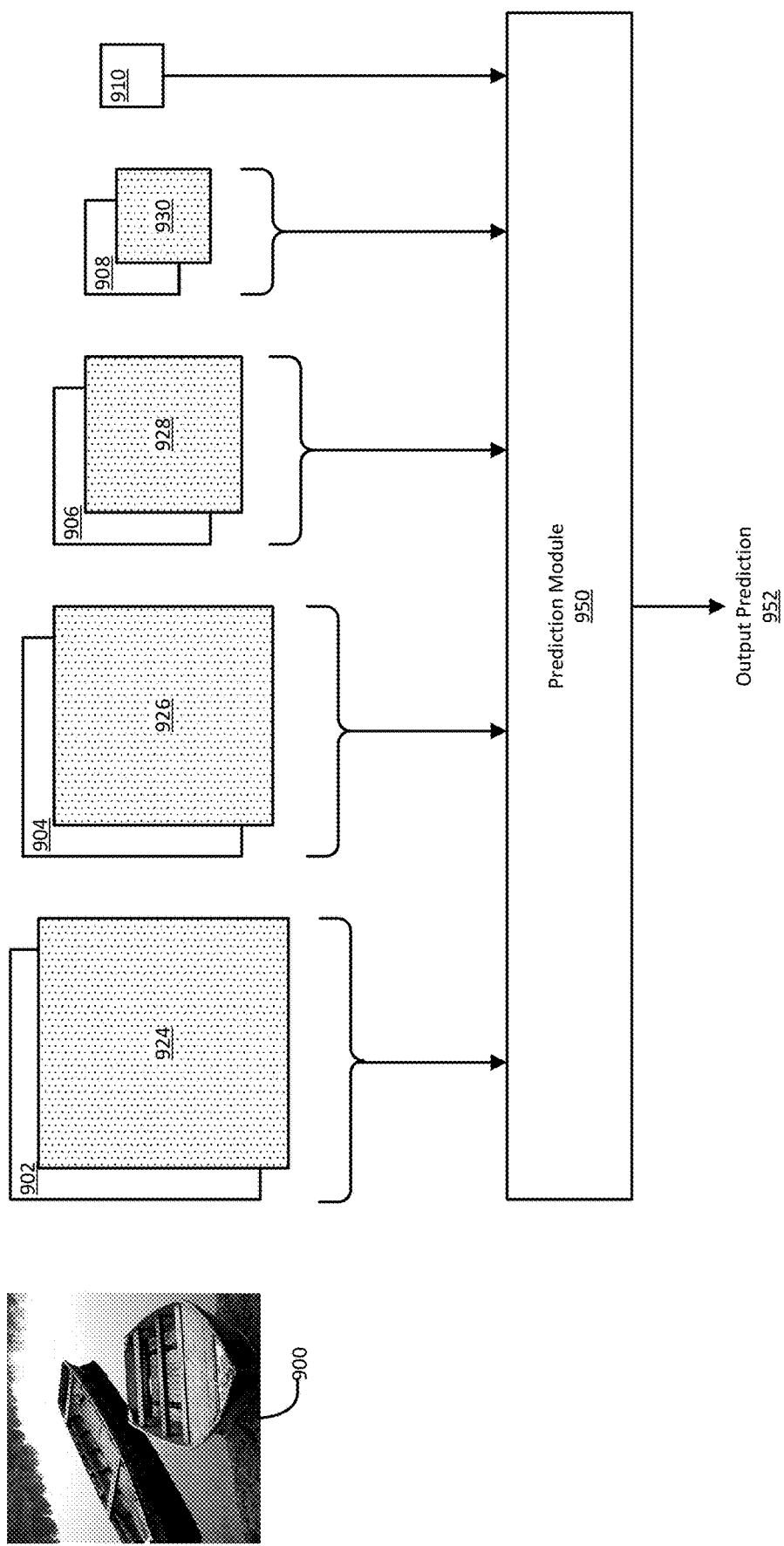
FIG. 9C illustrates a graphic example where combined feature maps are used to make an output prediction.

In various implementations, the combined feature maps can be used to make an output prediction 952, as illustrated in the example of FIG. 9C. In some implementations, the fifth non-combined feature map 910 and all of the combined feature maps can be input into a prediction module 950, which can determine a output prediction 952. The prediction module 950 can include, for example, pooling operations and/or classification operations (e.g, using fully-connected layers). In some implementations, only some of the combined feature maps are input into the prediction module 950. For example, in some implementations, only the combined fourth non-combined feature map 908 and first up-sampled feature map 930 plus the fifth non-combined feature map 910 are input into the prediction module 950.

In various implementations, the neural network architecture discussed above can be applied to any convolutional neural network, including multi-layer convolutional neural networks. As an example, the architecture has been applied to MobileNet, a convolutional neural network optimized for mobile vision applications. In this example, the convolutional units from MobileNet and some extra convolutional units were used to generate feature maps. The highest-level (and smallest) feature map was then up-sampled by a de-convolutional layer and combined with a feature map of the same size, using a lateral concatenation operation, as discussed above. Several combined feature maps with different resolutions were also generated. The combined feature maps and the highest-level feature map were then used for object detection.

Table 1 below illustrates example performance results for MobileNet, modified as noted above to include combined feature maps, as compared MobileNet without any combined feature maps and the Inception V2 neural network. Inception V2 is also a neural network that has been optimized for mobile platforms. To generate the results illustrated in Table 1 four additional convolutional units were added to the convolutional unit sform Inception V2 to generate feature maps. The PASCAL VOC dataset was used to produce the results in Table 1.

The example of Table 1 shows that, compared with the Inception V2 implementation that did not include combined feature maps, the MobileNet implementation with combined feature maps reduced the number of multiply-accumulate operations from 7.9G to 2.5G while achieving an improvement, from about 70% to about 73%, in detection accuracy. When compared with the MobileNet implementation that did not include combined feature maps, the MobileNet implementation with combined feature maps had a greater detection accuracy (73.1% as opposed to 70.0%), while needing slightly more multiply-accumulate operations.

TABLE 1

| | Multiply-accumulate operation (MACC)(G) | mAP (%) on VOC |
|---|---|---|
| Inception V2, non-combined | ~7.92 | 70.0 |
| MobileNet, non-combined | ~1.99 | 69.8 |
| MobileNet, combined | ~2.5 | 73.1 |

Figure 10:
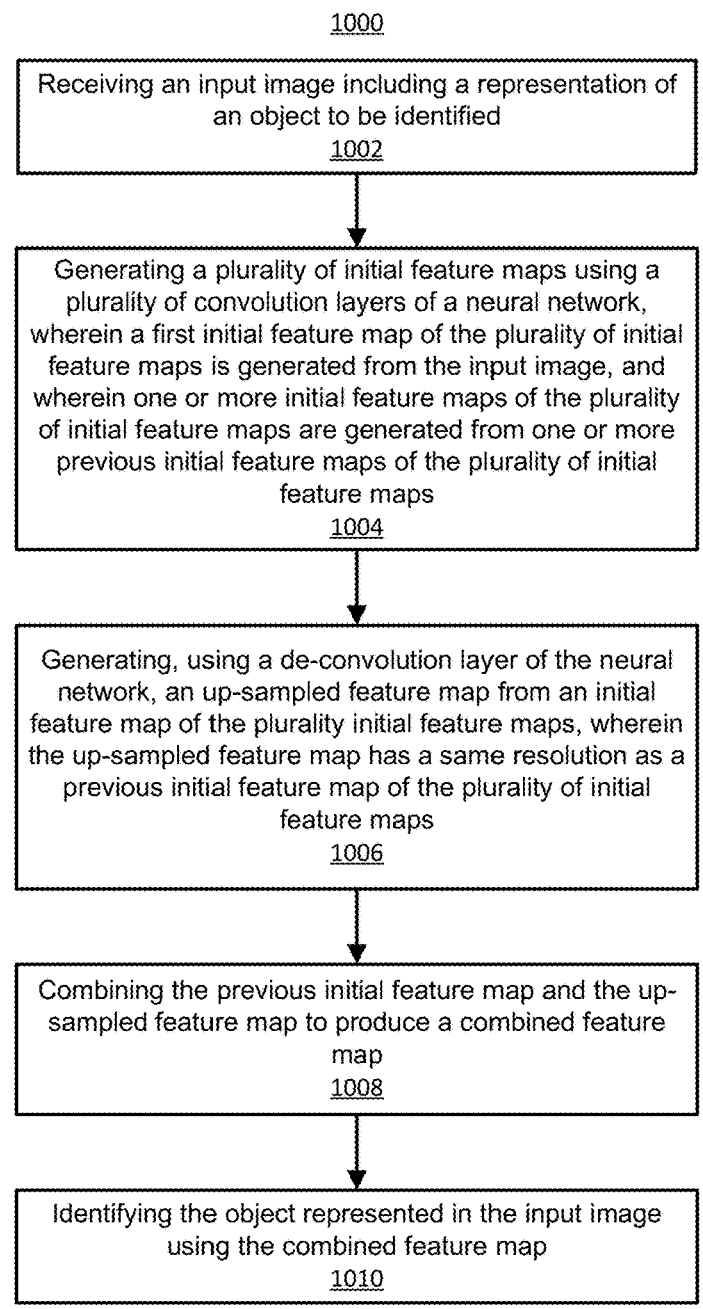
FIG. 10 is a flowchart illustrating an example of a process for object identification.

FIG. 10 is a flowchart illustrating an example of a process 1000 for object identification.

At step 1002, the process 1000 includes receiving an input image including a representation of an object to be identified. In various examples, a neural network has been trained to recognize objects in two-dimensional images. In these examples, the neural network can output a probability that the input image includes an object that the neural network has been trained to recognize. In some examples, the neural network is a convolutional neural network.

At step 1004, the process 1000 includes generating a plurality of initial feature maps using a plurality of convolution layers of a neural network, wherein a first initial feature map of the plurality of initial feature maps is generated from the input image, and wherein one or more initial feature maps of the plurality of initial feature maps are generated from one or more previous initial feature maps of the plurality of initial feature maps. The previous initial feature maps include the first initial feature map, which was generated from the input image. A last feature map is not used as previous initial feature map to generate another initial feature map. The plurality of initial feature maps are illustrated, for example, in FIG. 8A through FIG. 8D, in which the first non-combined feature map 802, second non-combined feature map 804, third non-combined feature map 806, fourth non-combined feature map 808, and fifth non-combined feature map 810 are each initial feature maps, and the first non-combined feature map 802 is a first initial feature map.

In various examples, the plurality of convolution layers perform a convolution to produce the plurality of initial feature maps. In some examples, the neural network performs additional steps to produce the plurality of initial feature maps, such as pooling.

At step 1006, the process 1000 of FIG. 10 includes generating, using a de-convolution layer of the neural network, an up-sampled feature map from an initial feature map of the plurality initial feature maps, wherein the up-sampled feature map has a same resolution as a previous initial feature map of the plurality of initial feature maps. Up-sampling of the initial feature map is illustrated, for example, in FIG. 8A through FIG. 8D, where first up-sampled feature map 830 is generated using a deconvolution 820 and has a same resolution as the fourth non-combined feature map 808, which is the previous initial feature map.

In some examples, the initial feature map used for the up-sampled feature map is the initial feature map with the smallest resolution. In some examples, an initial feature map other than the initial feature map with the smallest resolution is used to generated the up-sampled feature map. In various examples, de-convolution layer performs a deconvolution on the initial feature map to produce the up-sampled feature map.

At step 1008, the process 1000 of FIG. 10 includes combining the previous initial feature map and the up-sampled feature map to produce a combined feature map. In some examples, the previous initial feature map and the up-sampled feature map are combined using a concatenation operation. In some examples, the previous initial feature map and the up-sampled feature map are combined using a maximum value operation.

In some examples, the previous initial feature map is generated using a convolution layer from the plurality of convolution layers that precedes a convolution layer from the plurality of convolution layers used to generate the initial feature map. For example, as illustrated in FIG. 8A through FIG. 8D, the fourth non-combined feature map 808 is a previous initial feature map to fifth non-combined feature map 810, and is generated using a convolution layer that precedes the convolution layer that was used to generate fifth non-combined feature map 810.

In some examples, the combined feature map has a greater depth than the previous initial feature map. For example, when a concatenation operation is used to generate the combined feature map, the previous initial feature map and the initial feature map can be stacked on top of one another.

In some examples, the combined feature map has a same depth as the previous initial feature map. For example, when a maximum value operation is used to generated the combine feature map, the combined feature map includes a maximum value from the previous initial feature map or the initial feature map for each location in the matrix of the combined feature map.

In some examples, the up-sampled feature map is generated without using a rectified linear unit operation. For example, the up-sampled feature map can be the output of a de-convolution, without any non-linearity applied to the output. In these examples, the accuracy of the object identification may be improved.

At step 1010, the process 1000 of FIG. 10 includes identifying the object represented in the input image using the combined feature map.

In some examples, identifying the object further includes using a highest level feature map generated by the neural network. For example, as illustrated in FIG. 8A through 8D, the fifth non-combined feature map 810, which is the highest level feature map in the example of FIG. 8A through 8D, can also be used for identifying the object.

In some examples, identifying the object further includes categorizing the combined feature map using at least one fully-connected layer, wherein each node in the at least one fully-connected layer outputs a weighted sum that indicates a probable category.

In some examples, the process 1000 of FIG. 10 further includes generating, using a second de-convolution layer of the neural network, a second up-sampled feature map from the combined feature map, wherein the second up-sampled feature map has a same resolution as a second previous initial feature map from the plurality of initial feature maps. In these examples, the process 1000 further includes combining the second previous initial feature map with the second up-sampled feature map to produce a second combined feature map, wherein identifying the object is further based on the second combined feature map. For example, in the example illustrated in FIG. 8A through FIG. 8D, the first combined feature map 840 undergoes a de-convolution to produce a second up-sampled feature map 828, which has a same resolution as the second previous initial feature map, the third non-combined feature map 806. As further illustrated in this example, the second up-sampled feature map 828 is combined with the third non-combined feature map 806 to produce the second combined feature map 842.

Figure 11:
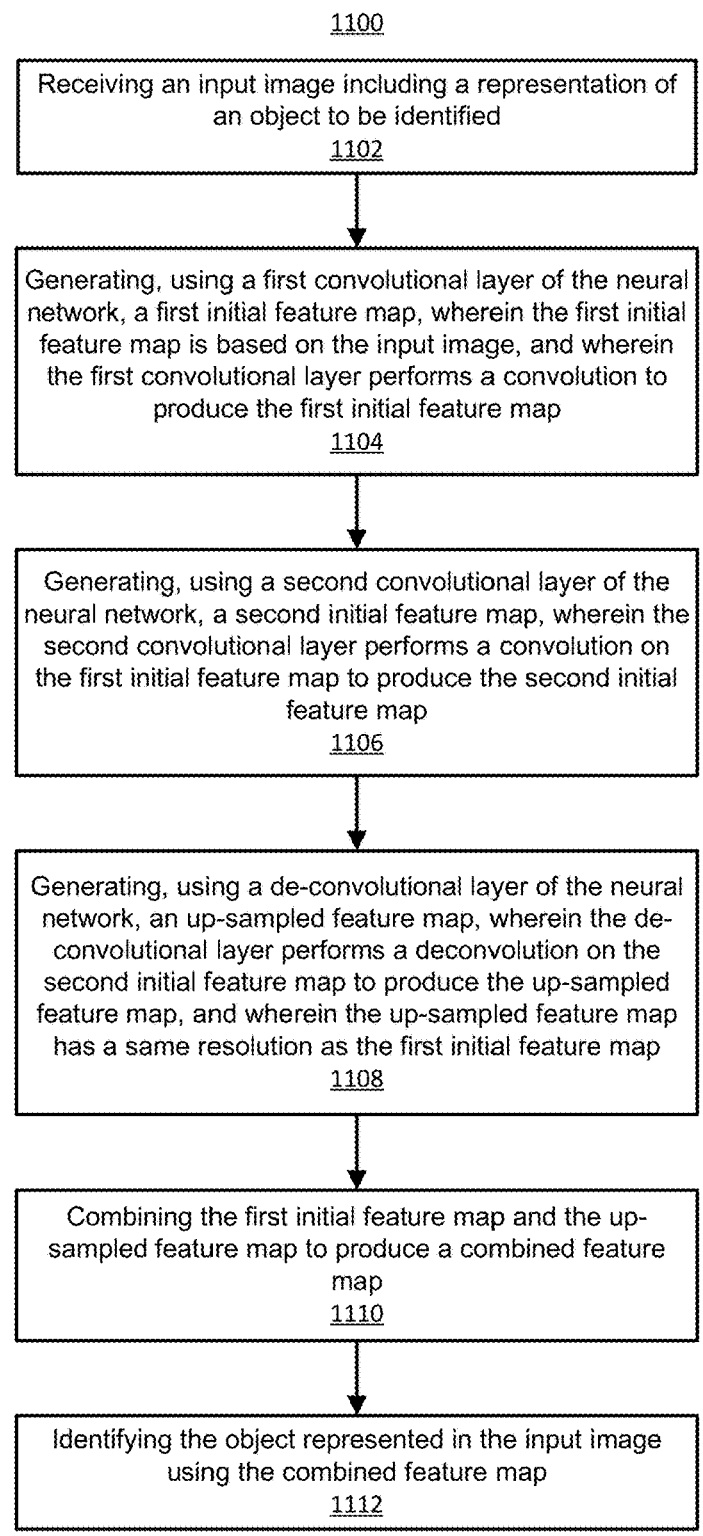
FIG. 11 is a flowchart illustrating an example of a process for operating a neural network.

FIG. 11 is a flowchart illustrating an example of a process 1100 for operating a neural network.

At step 1102, the process 1100 includes receiving an input image including a representation of an object to be identified. In various examples, neural network has been trained to recognize objects that are of the same type or category as the object represented in the input image.

At step 1104, the process 1100 includes generating, using a first convolutional layer of the neural network, a first initial feature map, wherein the first initial feature map is based on the input image, and wherein the first convolutional layer performs a convolution to produce the first initial feature map. In some examples, a rectified linear operation (ReLU) may be applied to the first initial feature map. In some examples, the first convolutional layer may be followed by a pooling layer. In these examples, the first initial feature map may be the output of the pooling layer.

At step 1106, the process 1100 includes generating, using a second convolutional layer of the neural network, a second initial feature map, wherein the second convolutional layer performs a convolution on the first initial feature map to produce the second initial feature map. In some examples, ReLU may be applied to the second initial feature map. In some examples, the second convolutional layer may be followed by a pooling layer, and the second initial feature map may be the output of the pooling layer.

At step 1108, the process 1100 includes generating, using a de-convolutional layer of the neural network, an up-sampled feature map, wherein the de-convolutional layer performs a deconvolution on the second initial feature map to produce the up-sampled feature map, and wherein the up-sampled feature map has a same resolution as the first initial feature map. In some examples, the up-sampled feature map is generated without using a rectified linear operation. In these examples ReLU is not applied to the output of the de-convolution.

At step 1110, the process 1100 includes combining the first initial feature map and the up-sampled feature map to produce a combined feature map. In some examples, the first initial feature map and the up-sampled feature map are combined using a concatenation operation. In some examples, the first initial feature map and the up-sampled feature map are combined using a maximum value operation. In some examples, the first initial feature map and the up-sampled feature map are combined using another operation.

In some examples, the combined feature map has a greater depth than the first initial feature map. In some examples, the combined feature map has a same depth as the first initial feature map.

At step 1112, the process 1100 includes identifying the object represented in the input image using the combined feature map. The neural network can produce, for example, a percentage that indicates a likelihood that the object falls within a category of objects that the neural network was trained to recognize. In some examples, identifying the object further includes using a highest level feature map generated by the neural network.

An example of the process 1100 is illustrated in FIG. 8A through FIG. 8D. In FIG. 8A through 8D, the fourth non-combined feature map 808 is a first initial feature map that is generated based on the input image 800. The fourth non-combined feature map 808 can undergo a convolution to produce a second initial feature map, the fifth non-combined feature map 810. The fifth non-combined feature map 810 can then undergo a de-convolution to produce an up-sampled feature map, the first up-sampled feature map 830, which has a same resolution as the fourth non-combined feature map 808. The first up-sampled feature map 830 and the fourth non-combined feature map 808 can then be combined to produce the combined feature map 840, which can be used to identify an object in the input image 800.

In some examples, the processes 1000, 1100 can further include generating additional initial feature maps using additional convolution layers. In these examples, one or more of the additional initial feature maps can also be de-convolved to produce additional up-sampled feature maps that have a higher resolution than the initial feature map used to produce each up-sampled feature map. The up-sampled feature maps can be combined with initial feature maps of the same resolution. The combined feature maps can then be used to identify the object represented in the input feature map.

In some examples, the processes 1000, 1100 may be performed by a computing device or an apparatus. For example, the processes 1000, 1100 can be performed by a computing device. In some cases, the computing device or apparatus may include a processor, microprocessor, microcomputer, or other component of a device that is configured to carry out the steps of processes 1000, 1100. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

The processes 1000, 1100 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1000, 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method for object identification, comprising:
receiving an input image including a representation of an object to be identified;
generating a plurality of feature maps using a plurality of convolution layers of a neural network, wherein a first feature map of the plurality of feature maps is generated from the input image, and wherein one or more feature maps of the plurality of feature maps are generated from one or more previous feature maps of the plurality of feature maps;
generating, using a de-convolution layer of the neural network, an up-sampled feature map from a feature map of the one or more feature maps, wherein the up-sampled feature map has a same resolution as a previous feature map of the plurality of feature maps;
combining the previous feature map and the up-sampled feature map to produce a combined feature map; and
identifying the object represented in the input image using the combined feature map.

2. The method of claim 1, wherein the previous feature map and the up-sampled feature map are combined using a concatenation operation.

3. The method of claim 1, wherein the previous feature map and the up-sampled feature map are combined using a maximum value operation.

4. The method of claim 1, wherein the combined feature map has a greater depth than the previous feature map.

5. The method of claim 1, wherein the combined feature map has a same depth as the previous feature map.

6. The method of claim 1, wherein the up-sampled feature map is generated without using a rectified linear unit operation.

7. The method of claim 1, wherein the plurality of convolution layers perform a convolution to produce the plurality of feature maps.

8. The method of claim 1, wherein the de-convolution layer performs a deconvolution on the feature map to produce the up-sampled feature map.

9. The method of claim 1, wherein identifying the object further includes using a highest level feature map generated by the neural network.

10. The method of claim 1, wherein identifying the object further includes categorizing the combined feature map using at least one fully-connected layer, wherein each node in the at least one fully-connected layer outputs a weighted sum that indicates a probable category.

11. The method of claim 1, further comprising:
generating, using a second de-convolution layer of the neural network, a second up-sampled feature map from the combined feature map, wherein the second up-sampled feature map has a same resolution as a second previous feature map from the plurality of feature maps; and
combining the second previous feature map with the second up-sampled feature map to produce a second combined feature map, wherein identifying the object is further based on the second combined feature map.

12. The method of claim 1, wherein the previous feature map is generated using a convolution layer from the plurality of convolution layers that precedes a convolution layer from the plurality of convolution layers used to generate the feature map.

13. An apparatus, comprising:
a memory configured to store an input image including a representation of an object to be identified; and
a processor configured to:
generate a plurality of feature maps using a plurality of convolution layers of a neural network, wherein a first feature map of the plurality of feature maps is generated from the input image, and wherein one or more feature maps of the plurality of feature maps are generated from one or more previous feature maps of the plurality of feature maps;
generate, using a de-convolution layer of the neural network, an up-sampled feature map from a feature map of the one or more feature maps, wherein the up-sampled feature map has a same resolution as a previous feature map of the plurality of feature maps;
combine the previous feature map and the up-sampled feature map to produce a combined feature map; and
identify the object represented in the input image using the combined feature map.

14. The apparatus of claim 13, wherein the previous feature map and the up-sampled feature map are combined using a concatenation operation.

15. The apparatus of claim 13, wherein the previous feature map and the up-sampled feature map are combined using a maximum value operation.

16. The apparatus of claim 13, wherein the combined feature map has a greater depth than the previous feature map.

17. The apparatus of claim 13, wherein the combined feature map has a same depth as the previous feature map.

18. The apparatus of claim 13, wherein the up-sampled feature map is generated without using a rectified linear unit operation.

19. The apparatus of claim 13, wherein the plurality of convolution layers perform a convolution to produce the plurality of feature maps.

20. The apparatus of claim 13, wherein the de-convolution layer performs a deconvolution on the feature map to produce the up-sampled feature map.

21. The apparatus of claim 13, wherein identifying the object further includes using a highest level feature map generated by the neural network.

22. The apparatus of claim 13, wherein identifying the object further includes categorizing the combined feature map using at least one fully-connected layer, wherein each node in the at least one fully-connected layer outputs a weighted sum that indicates a probable category.

23. The apparatus of claim 13, wherein the processor is further configured to:
generate, using a second de-convolution layer of the neural network, a second up-sampled feature map from the combined feature map, wherein the second up-sampled feature map has a same resolution as a second previous feature map from the plurality of feature maps; and
combine the second previous feature map with the second up-sampled feature map to produce a second combined feature map, wherein identifying the object is further based on the second combined feature map.

24. The apparatus of claim 13, wherein the previous feature map is generated using a convolution layer from the plurality of convolution layers that precedes a convolution layer from the plurality of convolution layers used to generate the feature map.

25. A non-transitory computer-readable medium having stored thereon instructions that, when executed by a processor, cause the processor to perform operations including:
    receiving an input image including a representation of an object to be identified;
    generating a plurality of feature maps using a plurality of convolution layers of a neural network, wherein a first feature map of the plurality of feature maps is generated from the input image, and wherein one or more feature maps of the plurality of initial feature maps are generated from one or more previous feature maps of the plurality of feature maps;
    generating, using a de-convolution layer of the neural network, an up-sampled feature map from a feature map of the one or more feature maps, wherein the up-sampled feature map has a same resolution as a previous feature map of the plurality of feature maps;
    combining the previous feature map and the up-sampled feature map to produce a combined feature map; and
    identifying the object represented in the input image using the combined feature map.

26. The non-transitory computer-readable medium of claim 25, wherein the previous feature map and the up-sampled feature map are combined using a concatenation operation.

27. The non-transitory computer-readable medium of claim 25, wherein the combined feature map has a greater depth than the previous feature map.

28. The non-transitory computer-readable medium of claim 25, wherein the combined feature map has a same depth as the first feature map.

29. The non-transitory computer-readable medium of claim 25, wherein the up-sampled feature map is generated without using a rectified linear unit operation.

30. An apparatus, comprising:
    means for receiving an input image including a representation of an object to be identified;
    means for generating a plurality of feature maps using a plurality of convolution layers of a neural network, wherein a first feature map of the plurality of feature maps is generated from the input image, and wherein one or more feature maps of the plurality of feature maps are generated from one or more previous feature maps of the plurality of feature maps;
    means for generating, using a de-convolution layer of the neural network, an up-sampled feature map from a feature map of the one or more feature maps, wherein the up-sampled feature map has a same resolution as a previous feature map of the plurality of feature maps;
    means for combining the previous feature map and the up-sampled feature map to produce a combined feature map; and
    means for identifying the object represented in the input image using the combined feature map.

* * * * *